US009063768B2

(12) United States Patent
Soundararajan et al.

(10) Patent No.: US 9,063,768 B2
(45) Date of Patent: Jun. 23, 2015

(54) METHOD AND APPARATUS FOR COMPARING CONFIGURATION AND TOPOLOGY OF VIRTUALIZED DATACENTER INVENTORIES

(75) Inventors: Vijayaraghavan Soundararajan, Palo Alto, CA (US); Balaji Parimi, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 243 days.

(21) Appl. No.: 13/269,961

(22) Filed: Oct. 10, 2011

(65) Prior Publication Data

US 2013/0091499 A1    Apr. 11, 2013

(51) Int. Cl.
*G06F 7/00* (2006.01)
*G06F 12/00* (2006.01)
*G06F 9/455* (2006.01)

(52) U.S. Cl.
CPC .... *G06F 9/45558* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 5,905,990 | A * | 5/1999 | Inglett | 1/1 |
| 6,208,991 | B1 * | 3/2001 | French et al. | 1/1 |
| 6,684,293 | B1 * | 1/2004 | Backman et al. | 711/111 |
| 7,558,926 | B1 | 7/2009 | Oliveira et al. | |
| 7,702,870 | B2 | 4/2010 | English et al. | |
| 7,769,722 | B1 | 8/2010 | Bergant et al. | |
| 7,827,201 | B1 | 11/2010 | Gordon et al. | |
| 7,886,119 | B1 * | 2/2011 | Cameron et al. | 711/162 |
| 8,019,925 | B1 * | 9/2011 | Vogan et al. | 711/4 |
| 8,204,860 | B1 * | 6/2012 | Ferguson et al. | 707/639 |
| 8,281,093 | B1 * | 10/2012 | Krishnan et al. | 711/162 |
| 8,359,594 | B1 * | 1/2013 | Davidson et al. | 718/1 |
| 8,364,639 | B1 * | 1/2013 | Koryakina et al. | 707/639 |
| 8,412,688 | B1 * | 4/2013 | Armangau et al. | 707/695 |
| 8,515,911 | B1 * | 8/2013 | Zhou et al. | 707/638 |
| 8,825,602 | B1 * | 9/2014 | Desai et al. | 707/646 |
| 2002/0144238 | A1 * | 10/2002 | Hanson | 717/128 |
| 2003/0163413 | A1 * | 8/2003 | Wiczkowski | 705/38 |
| 2007/0106706 | A1 * | 5/2007 | Ahrens et al. | 707/202 |
| 2007/0156506 | A1 * | 7/2007 | Hara | 705/10 |
| 2007/0198605 | A1 | 8/2007 | Saika | |

(Continued)

FOREIGN PATENT DOCUMENTS

| | | |
|---|---|---|
| WO | 0180013 A1 | 10/2001 |
| WO | 2010087803 A1 | 8/2010 |
| WO | 2011070605 A1 | 6/2011 |

OTHER PUBLICATIONS

International Search Report and Written Opinion dated Oct. 16, 2012 for PCT Application PCT/US2012/051840, 10 pages.

(Continued)

*Primary Examiner* — Adam Lee

(57) ABSTRACT

Disclosed herein is a method of verifying that a reconstructed inventory of a virtualized computer system has been accurately reproduced from an original inventory of a virtualized computer system. A first snapshot and a second snapshot are received, where the first snapshot is a snapshot of the original inventory and the second snapshot is a snapshot of the reconstructed inventory. The first snapshot and the second snapshot are then analyzed to determine that hierarchical relationships, roles and permissions, configuration settings, and/or custom definitions of items in the original inventory match hierarchical relationships of corresponding items in the reconstructed inventory.

20 Claims, 16 Drawing Sheets

(56) References Cited

U.S. PATENT DOCUMENTS

| | | | |
|---|---|---|---|
| 2008/0215836 A1* | 9/2008 | Sutoh et al. | 711/162 |
| 2008/0307016 A1* | 12/2008 | Hornkvist et al. | 707/204 |
| 2009/0006619 A1* | 1/2009 | Mohammed et al. | 709/225 |
| 2009/0007100 A1* | 1/2009 | Field et al. | 718/1 |
| 2009/0172039 A1 | 7/2009 | Honami et al. | |
| 2009/0177878 A1* | 7/2009 | Gao et al. | 713/100 |
| 2009/0210723 A1* | 8/2009 | Yoshida | 713/189 |
| 2009/0210875 A1 | 8/2009 | Bolles et al. | |
| 2009/0300416 A1* | 12/2009 | Watanabe et al. | 714/19 |
| 2010/0037235 A1* | 2/2010 | Larimore et al. | 719/312 |
| 2010/0115222 A1 | 5/2010 | Usami | |
| 2010/0153947 A1 | 6/2010 | Haruma | |
| 2010/0257602 A1* | 10/2010 | Kettler et al. | 726/19 |
| 2010/0281356 A1* | 11/2010 | Klingenberg et al. | 715/234 |
| 2011/0078398 A1 | 3/2011 | Jess | |
| 2011/0137863 A1* | 6/2011 | Anzai et al. | 707/639 |
| 2011/0161299 A1 | 6/2011 | Prahlad et al. | |
| 2011/0197097 A1* | 8/2011 | Beaty et al. | 714/27 |
| 2011/0208940 A1 | 8/2011 | Naganuma et al. | |
| 2011/0252208 A1* | 10/2011 | Ali et al. | 711/162 |
| 2011/0276770 A1* | 11/2011 | Zhu et al. | 711/160 |
| 2012/0054554 A1* | 3/2012 | Dagan | 714/39 |
| 2012/0084521 A1* | 4/2012 | Fukui et al. | 711/162 |
| 2012/0233123 A1* | 9/2012 | Shisheng et al. | 707/639 |
| 2012/0317373 A1 | 12/2012 | Ninose et al. | |
| 2012/0324236 A1* | 12/2012 | Srivastava et al. | 713/189 |

OTHER PUBLICATIONS

International Search Report and Written Opinion dated Nov. 2, 2012 for PCT Application PCT/US2012/051600, 9 pages.

International Search Report and Written Opinion dated Nov. 2, 2012 for PCT Application PCT/US2012/052039, 11 pages.

International Search Report and Written Opinion dated Dec. 4, 2012 for PCT Application PCT/US2012/051872, 10 pages.

* cited by examiner

METHOD AND APPARATUS FOR COMPARING CONFIGURATION AND TOPOLOGY OF VIRTUALIZED DATACENTER INVENTORIES

BACKGROUND

Software for managing a virtualized data center is responsible for monitoring physical hosts and virtual machines (VMs) running in the physical hosts and, further, for performing management operations such as provisioning and configuration tasks. One example of such management software is vSphere™ by VMware of Palo Alto, Calif. The complete set of hosts, VMs, data storage elements (datastores), networks, and the organization of these elements into data centers, clusters, and resource pools, managed by such software, is commonly referred to as a virtualized computer inventory (hereinafter referred to as the "inventory"). In particular, the virtualized computer inventory comprises both topological data related to the foregoing elements and the configuration settings thereof.

Under certain circumstances, migration or reconstruction of an inventory may be desired or needed. For example, when a given cluster and the settings associated therewith have been tested in development and are ready to be moved into production, a production inventory is generated based on the development inventory. To give another example, an existing inventory that works well for a data center or across multiple data centers may be replicated by administrators for use with different data centers.

One existing technique for performing inventory migrations or reconstructions is described in U.S. patent application Ser. No. 13/020,300, filed Feb. 3, 2011 and entitled "Programmatic Snapshot and Revert of Virtualized Data Center Inventory," which is incorporated by reference herein. According to this technique, a VM management center is queried to retrieve and store relationships between various entities, the permissions and roles associated with those entities, and the configuration settings of those entities. From this stored data, code for reconstructing the inventory of the virtualized computer system is generated.

A reconstructed virtualized computing inventory may not always be an exact copy of the original virtualized computing inventory. For example, an error may occur during the reconstruction of a virtualized computing inventory, or the reconstructed virtualized computing inventory may be based on erroneously-analyzed topology and/or configuration settings of an original virtualized computing inventory. Therefore, it is desirable to confirm this after reconstruction.

SUMMARY

One or more embodiments of the present invention provide a technique of verifying that a reconstructed inventory of a virtualized computer system has been accurately reproduced from an original inventory of a virtualized computer system. The technique includes the steps of retrieving first and second snapshots, wherein the first snapshot is a snapshot of the original inventory and the second snapshot is a snapshot of the reconstructed inventory, and analyzing the first snapshot and the second snapshot to determine that hierarchical relationships of items in the original inventory match hierarchical relationships of corresponding items in the reconstructed inventory. In some embodiments, the technique further includes the steps of analyzing the first snapshot and the second snapshot to determine that configuration settings of items in the original inventory match configuration settings of corresponding items in the reconstructed inventory.

Further embodiments of the present invention include, without limitation, a non-transitory computer-readable storage medium that includes instructions that enable a processing unit to implement one or more aspects of the above methods.

DETAILED DESCRIPTION

Figure 1:
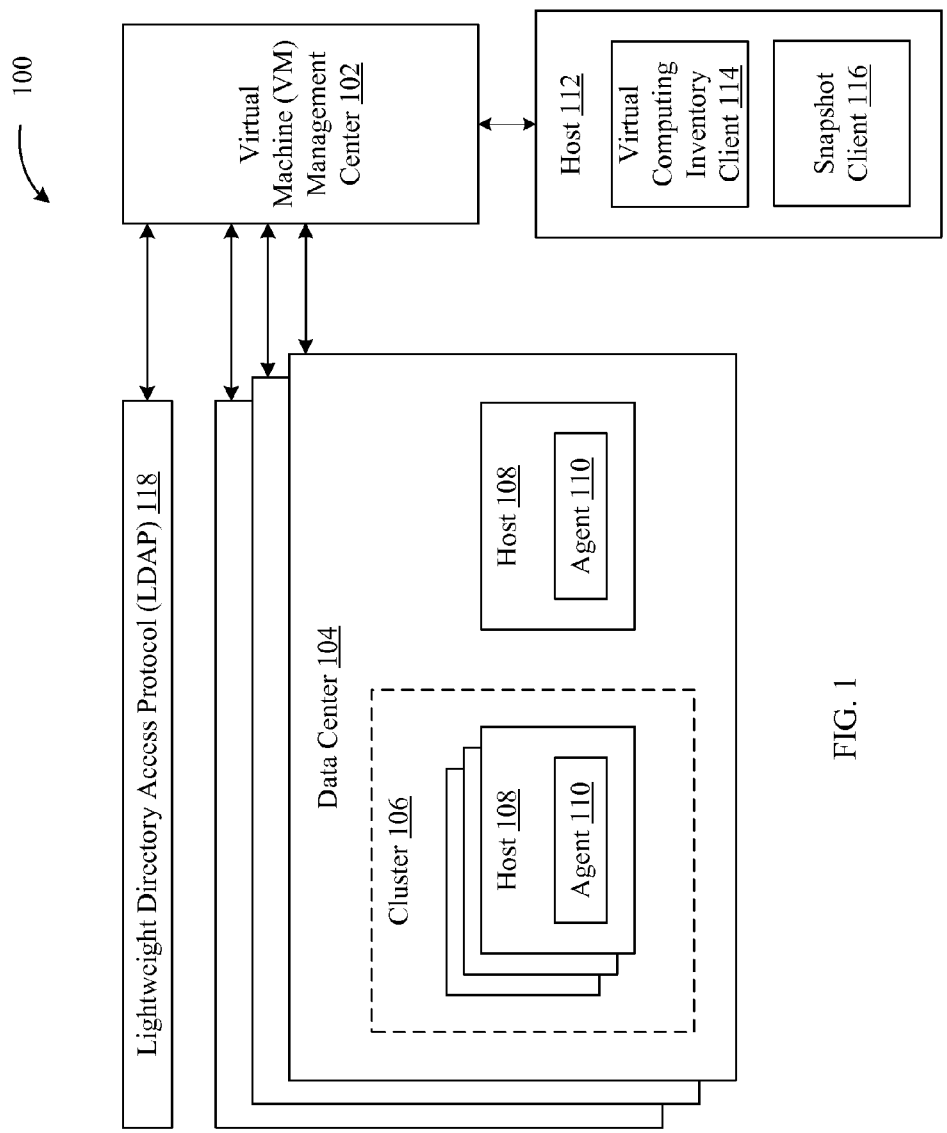
FIG. 1 depicts a block diagram of a virtualized computer system in which one or more embodiments of the present invention may be implemented.

FIG. 1 depicts a block diagram of a virtualized computer system 100 in which one or more embodiments of the present invention may be implemented. As illustrated, virtualized computer system 100 includes data centers of which only a first data center 104 is shown. First data center includes cluster 106 and host computers 108. Here, host computers 108 (also referred to herein as "servers") are configured to deliver virtualization-based distributed services to information technology environments, and may or may not be included in a cluster, e.g. cluster 106. Each host computer 108 provides a virtualization layer that abstracts processor, memory, storage, and/or networking resources into multiple virtual machines that run side-by-side on the same host computer 108, as further described in conjunction with FIG. 2.

A virtual machine (VM) management center 102 is also included in system 100. VM management center 102 manages the virtual computer inventory, including managing data centers 104, the virtual machines running within each host computer 108, provisioning, migration, resource allocations, and so on. In one embodiment, VM management center 102 is configured to interact with agent 110 included in host computers 108 to exchange information using application programming interface calls (API) calls.

A VM management center client (vSphere client) 114, as shown in FIG. 1, is executed on a host computer 112 which is separate from virtualized computer system 100. Here, vSphere client 114 is configured to interact with VM management center 102 using various techniques including, but not limited to, API calls, web services messages, and the like. VSphere client 114 can be used to perform one or more tasks requested by an administrator, such as configuring storage and network connections, managing a service console, or querying data from host computers via agent 110. In one embodiment, a stand-alone desktop application version of vSphere client 114 is provided. In another embodiment, a browser based application provides the functionality of vSphere client 114.

VM management center 102 is used by an administrator to customize roles and permissions for various users. The administrator may perform this task by selecting from an extensive list of permissions to grant to each role and assigning roles the users. In one embodiment, such roles and permissions are stored separately from VM management center 102 in a lightweight directory access protocol (LDAP) database 118, as illustrated in FIG. 1. In other embodiments, the roles and permissions may be stored within and managed by VM management center 102. VM management center 102 can also provide full audit tracking to provide a detailed record of every action and operation performed on the virtualized computer inventory. As described in greater detail herein, embodiments of the invention provide a user interface for snapshot client 116 that allows an administrator to create a snapshot of an inventory managed by VM management center 102.

Figure 2:
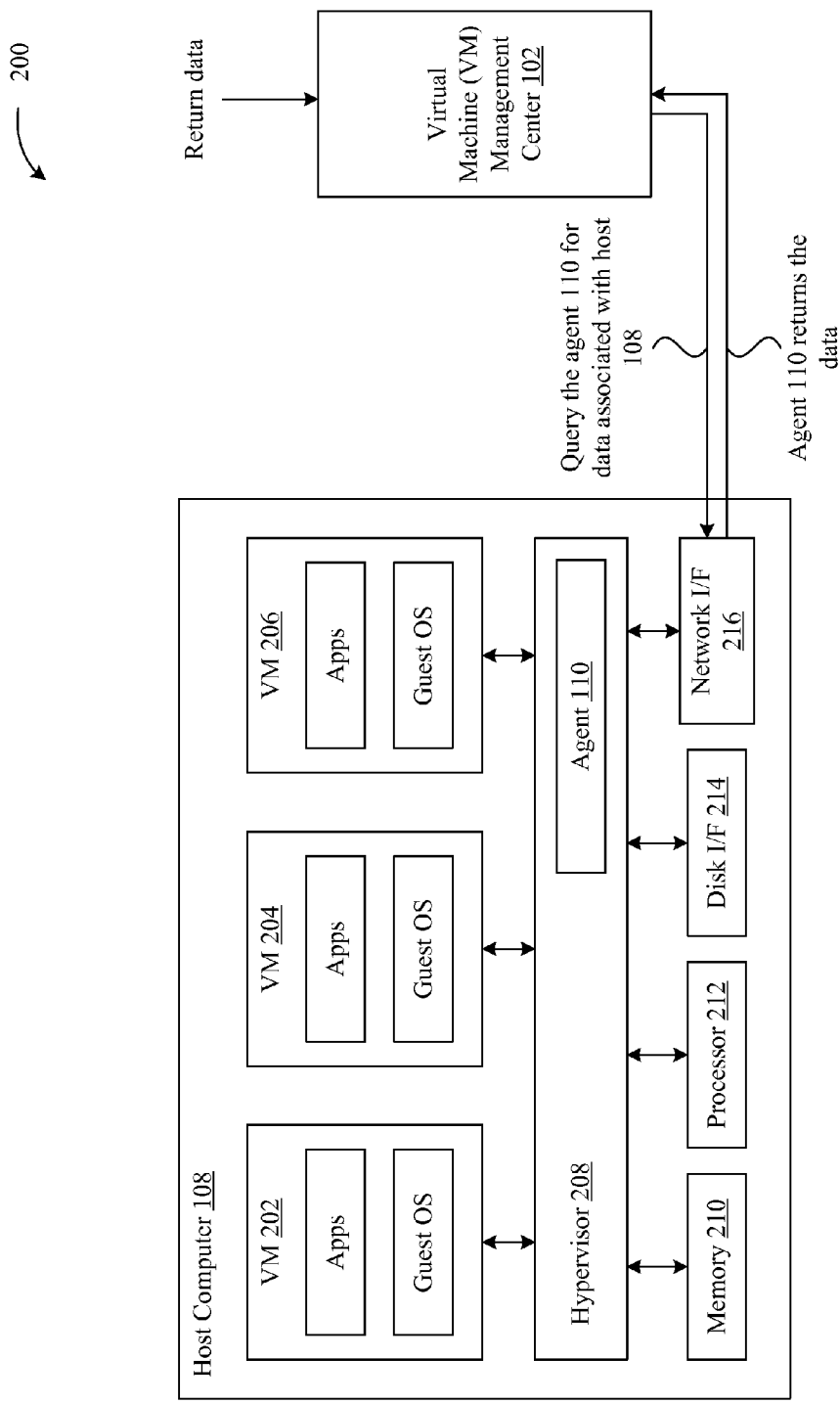
FIG. 2 depicts a block diagram of a host computer and VM management center, according to one embodiment of the invention.

FIG. 2 depicts a block diagram of a host computer 108 and VM management center 102, according to one embodiment of the invention. A virtualized computing environment includes a host computer 108 that has conventional components of a computing device. One or more virtual machines are configured within host computer 108, represented in FIG. 2 as VM 202, VM 204, and VM 206, which share hardware resources of host computer 108, such as memory 210, processor 212, disk interface 214, and network interface 216. Examples of disk interface 214 are a host bus adapter and a network file system interface. An example of network interface 216 is a network adapter, also referred to as a Network Interface Card (NIC). In some embodiments, a plurality of NICs is included in the network interface 216.

The virtual machines run on top of hypervisor 208, which is a software interface layer that enables sharing of the hardware resources of host computer 108 by the virtual machines. Hypervisor 208 may run on top of the operating system of the host computer 108 or directly on hardware components of the host computer 108. Each virtual machine includes a guest operating system and one or more guest applications. The guest operating system is a master control program of the virtual machine and, among other things, the guest operating system forms a software platform on top of which the guest applications run. As also shown, agent 110 is provided in hypervisor 208, by which specific information pertaining to the virtualization settings and configurations of host computer 108, and any VMs included therein, are transmitted to VM management center 102 as will be further described below. However, in the event that the VM management center 102 is unavailable, the databases to which the VM management center 102 is attached, e.g., LDAP 118 any additional databases (not shown) that include the information may be queried directly by the snapshot client 116.

Figure 3:
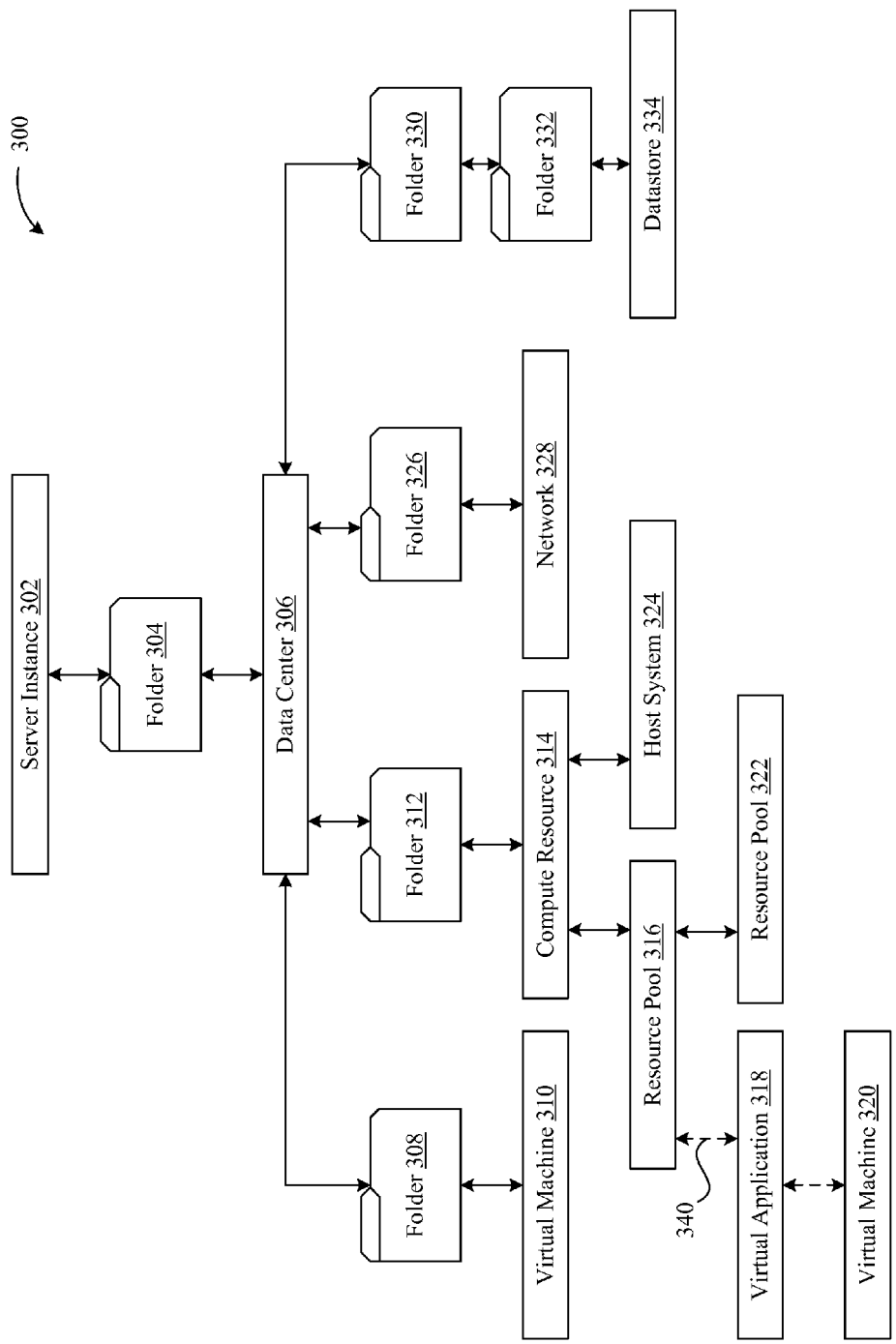
FIG. 3 depicts an exemplary hierarchical organization of a virtualized computer inventory, according to one embodiment of the invention.

FIG. 3 depicts an exemplary hierarchical organization of a virtualized computer inventory 300, according to one embodiment of the invention. Note that, although only certain entities included in the virtualized computer inventory 300 are illustrated as nested entities, the folders, the resource pools, and the virtual applications are capable of being nested. As illustrated, a server instance 302 is at the root of the hierarchy and includes folder 304, which includes data center 306. Here, folders are logical containers of entities managed by VM management center 102. Data center 306 includes folder 308, folder 312, folder 326, and folder 330. Folder 308 includes virtual machine 310. Folder 312 includes compute resource 314, which includes resource pool 316 and host system 324. Resource pool 316 includes virtual application 318 and resource pool 322, where virtual application 318 includes virtual machine 320. Additionally, folder 326 includes network 328, where the network represents, for example, a virtualized computer network, a distributed virtual switch, a distributed virtual port group, or the like. Finally, folder 330 includes folder 332, which includes datastore 334. It should be recognized that virtualized computer inventory 300 can be modified by an administrator using a user interface to include other server instances, folders, data centers, virtual machines, compute resources, resource pools, virtual applications, networks, datastores, distributed virtual switches, virtual ports, and the like, and change the relationships between the entities.

The relationships set forth in virtualized computer inventory 300 are explicit relationships that are identifiable based on the hosts, clusters, and VMs view shown in FIG. 3. However, implicit relationships, which are relationships between entities that are not identifiable according to the view presented in FIG. 3—may be present in virtualized computer inventory 300. Relationship 340 represents an implicit relationship that exists between resource pool 316 and virtual application 318 that is not shown when viewing virtualized computer inventory 300 according to the view in FIG. 3. Under other views, e.g., hosts and clusters view, the implicit relationship may be viewed as an explicit relationship. These implicit relationships are identifiable by parsing and processing information associated with virtualized computer inventory 300, as further described below in conjunction with FIG. 4.

FIG. 4 is a flow diagram of a method 400 for generating a snapshot of a virtualized computer inventory, according to one or more embodiments of the present invention. Although the method steps are described in conjunction with the systems of FIGS. 1-3, persons skilled in the art will understand that any system configured to perform the method steps is within the scope of the invention.

As shown, method 400 begins at step 402, where snapshot client 116 running in host computer 112 initializes a process to determine relational data between entities included in an inventory managed by a management server, i.e., virtualized computer inventory 300 and VM management center 102, respectively. To accomplish this determination, snapshot client 116, at step 404 illustrated in FIG. 4B, queries VM management center 102 for a list of object references that each reference a different entity included in virtualized computer inventory 300, e.g., folder 304, data center 306, folders 308-312, etc. as illustrated in FIG. 3.

At step 406, snapshot client 116 obtains, for each object reference, a name of the referenced entity. In one example, data center 306 in virtualized computer inventory 300 is associated with the name "Main_Datacenter." At step 408, snapshot client 116 obtains, for each object reference, a name of a data center to which each referenced entity belongs. Continuing with reference to the virtualized computer inventory 300, snapshot client 116 determines that each of entities 308-334 belong to data center 306. This is useful because certain entity names (e.g., of distributed virtual switches) are required to be unique within a particular data center, but not across one or more data centers. Thus, the obtained names of data centers can be used when reconstructing virtualized computer inventory 300 to specify precisely which entity is being restored.

At step 410, snapshot client 116 obtains, for each object reference that references a VM entity, a name of a resource pool to which the VM entity belongs. Thus, according to virtualized computer inventory 300, snapshot client 116 determines that VM 320 belongs to resource pool 316. This information is useful because the explicit parent for a VM is a VM folder, but a resource pool may exist as an implicit parent to the VM. More specifically, a VM may reside within a resource pool, even though the resource pool is not a parent to the VM. During reconstruction of virtualized computer inventory 300, a VM must be added to virtualized computer inventory 300 before it can be moved into a resource pool.

At step 412, snapshot client 116 queries VM management center 102 for each object reference to determine a parent entity to the referenced entity. For example, with respect to virtualized computer inventory 300, the parent to resource pool 322 is resource pool 316, and the parent to host system 324 is compute resource 314.

At step 414, snapshot client 116 creates, based on the determined parent entities, parent to child relationships between the entities. At step 416, snapshot client 116 creates, based on the determined parent entities, child to parent relationships between the entities. In addition, snapshot client 116 identifies, based on the parent to child and child to parent relationships between the entities, remaining implicit relationships between the entities. For example, in vSphere™, a VM may belong to a folder, a virtual application (vApp), or both. A vApp is a multi-VM package that provides a standard way to describe operational policies for a high-level system that is executable by, for example, a cloud operating system. For example, a vApp directed to customer relationship management (CRM) might include a VM for a database server, a VM for an application server and a VM for a web server.

In the case that the VM belongs to a folder and a vApp, the folder is an explicit parent to the VM, while the vApp is an implicit parent to the VM. Thus, snapshot client 116 identifies relationships between entities by querying VM management center 102 for VMs that are managed by each vApp included in virtualized computer inventory 300. Host 112 further identifies any parent folders to each vApp included in virtualized computer inventory 300. Such identifications are necessary when reconstructing virtualized computer inventory 300. For example, when reconstructing virtualized computer inventory 300 using vSphere™, a vApp must be added before the vApp is included in a folder. Therefore, the folder must be tracked during the reconstruction of virtualized computer inventory 300 so that the vApp is moved properly after being added. Note that snapshot client 116 is configurable to remove any redundant relational data, thereby decreasing the overall amount of memory and processing resources required to store and generate the snapshot. For example, every host contains a list of VMs that are currently running on that host. When VM management center 102 adds a host to an inventory, this list of VMs is retrieved from the host and these are automatically added to the inventory, so no relational data between hosts and VMs needs to be analyzed when creating a snapshot to the inventory. At step 418, snapshot client 116 stores the obtained and determined data as inventory relational data in a memory, e.g. memory 210.

Figure 4A:
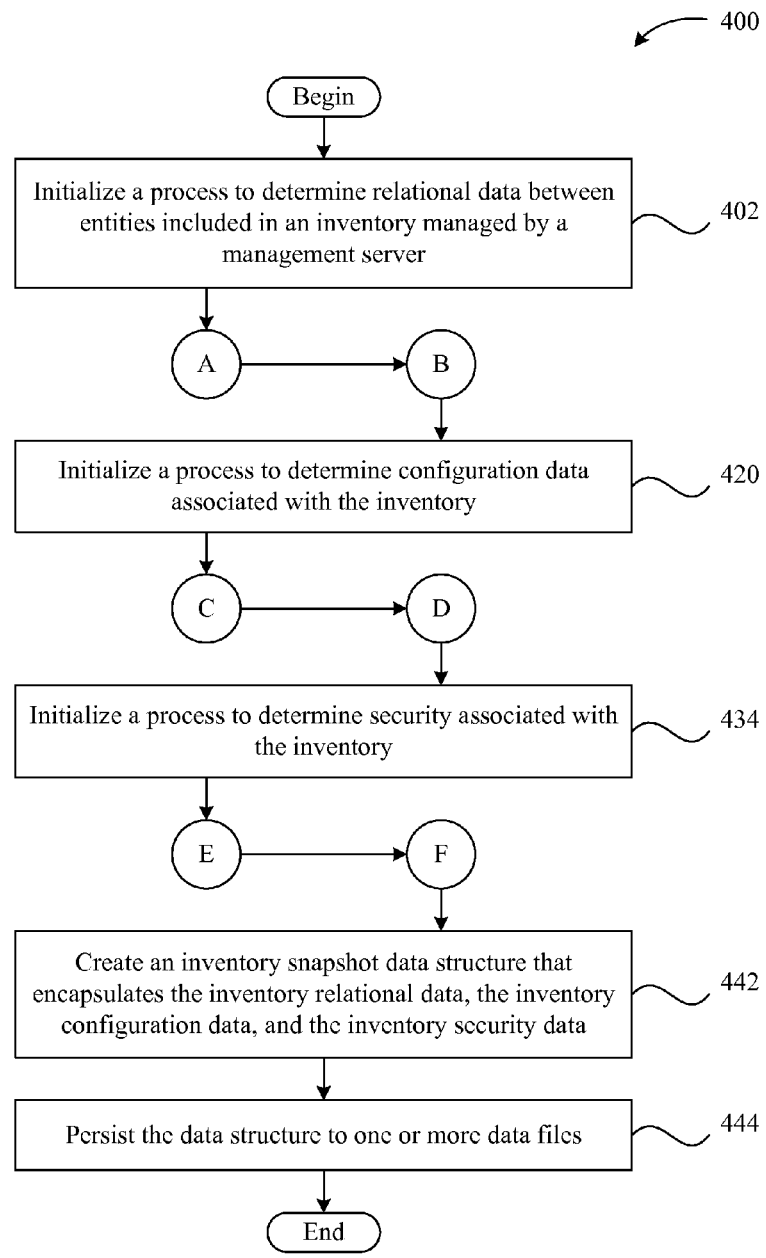
FIG. 4A-4D is a flow diagram of method steps for generating a snapshot of a virtualized computer inventory, according to one or more embodiments of the present invention.
Figure 4B:
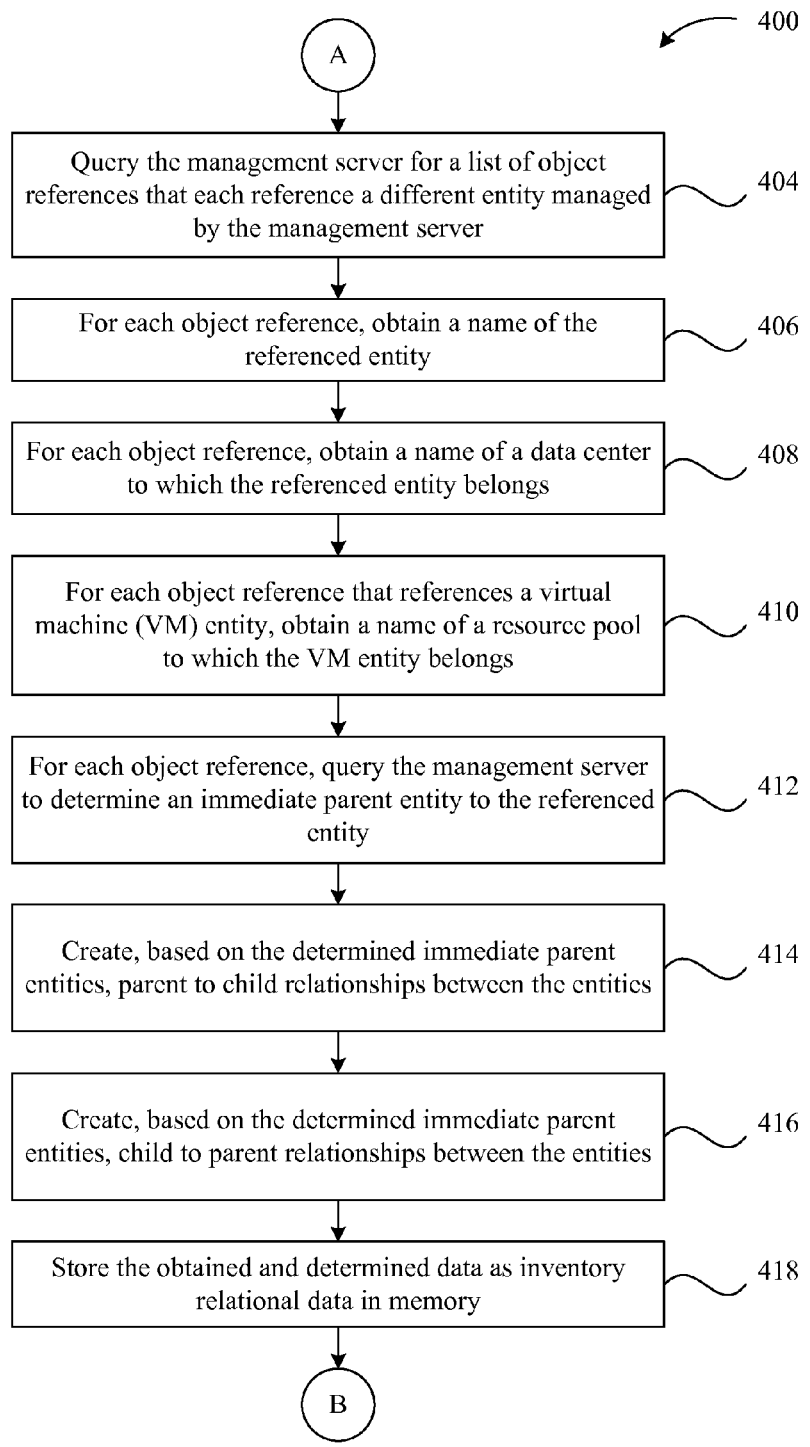
Figure 4C:
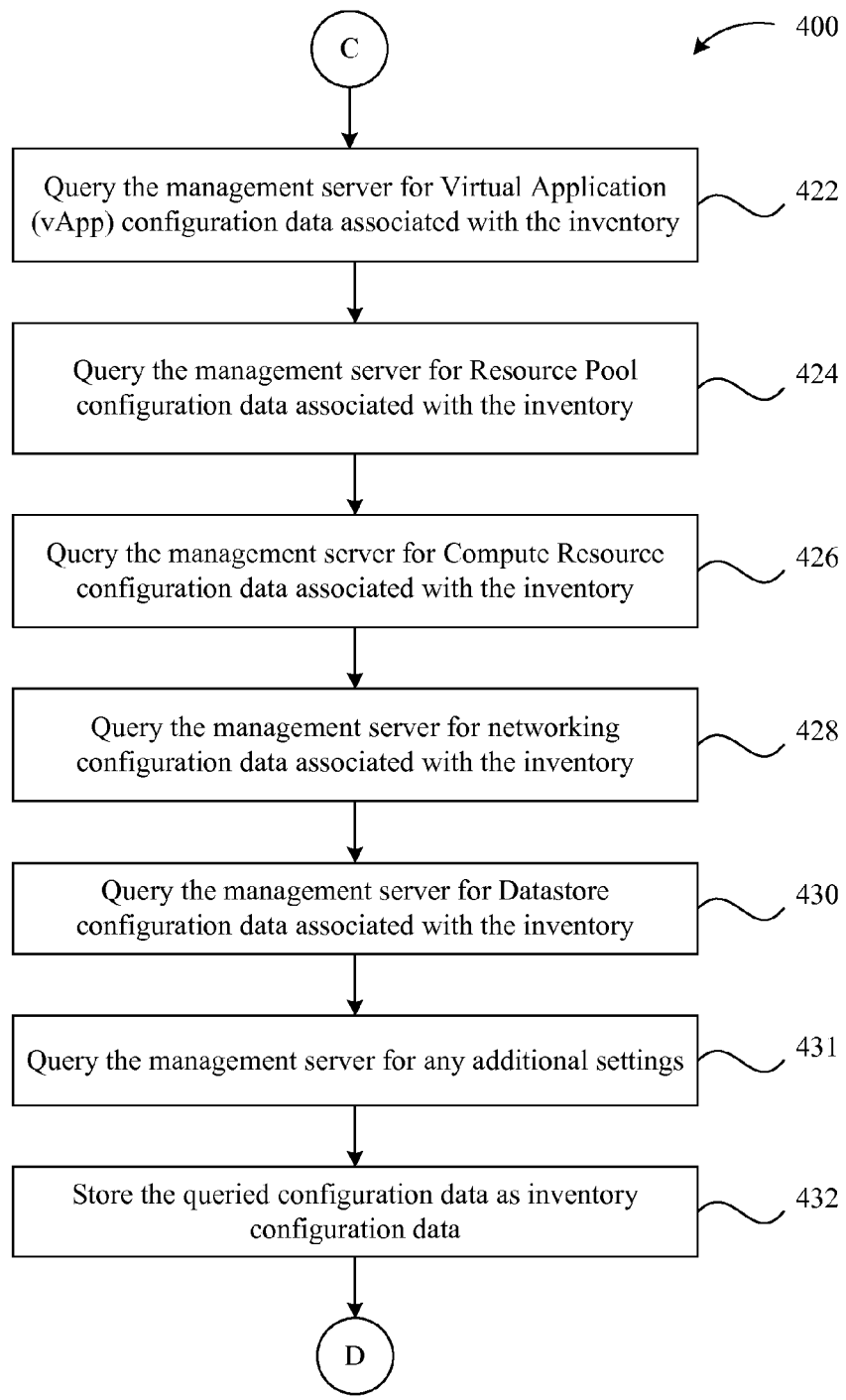
Figure 4D:
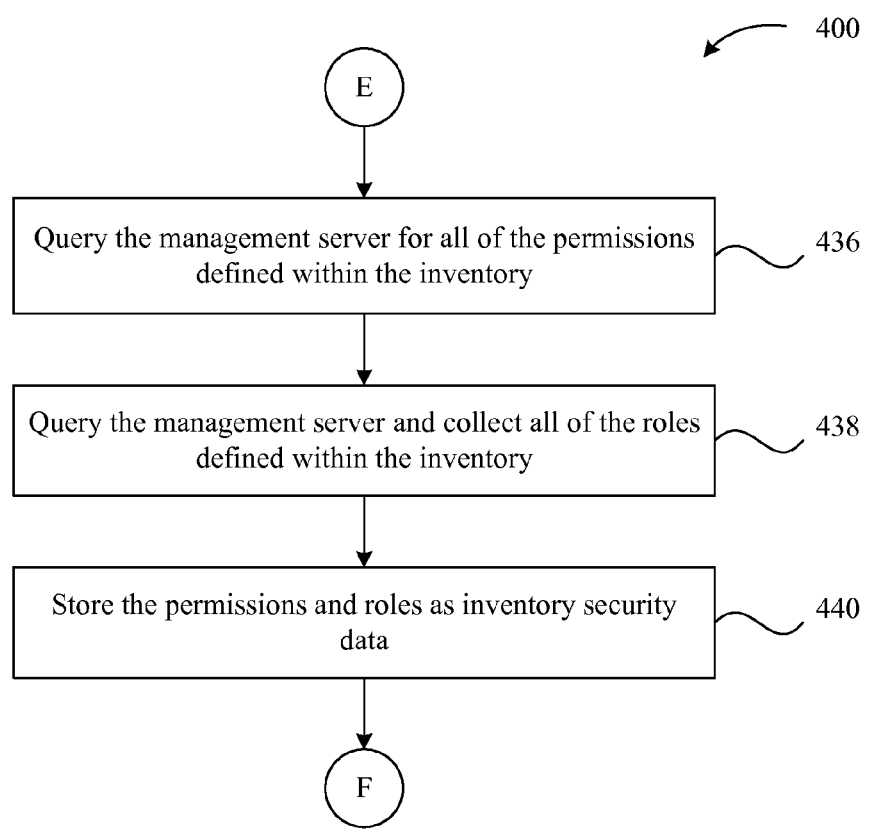

Referring now back to FIG. 4A, at step 420, snapshot client 116 initializes a process to determine configuration data associated with the inventory. At step 422, illustrated in FIG. 4B, snapshot client 116 queries VM management center 102 for virtual application (vApp) configuration data associated with virtualized computer inventory 300. In turn, VM management center 102, if required, communicates with agents 110 included in hosts 108 to obtain configuration data. This configuration data specifies at least the VMs included in each vApp, and any resource settings corresponding thereto, e.g., CPU and memory limitations, shares, and reservations of the vApp.

At step 424, snapshot client 116 queries VM management center 102 for resource pool configuration data associated with virtualized computer inventory 300, e.g., configuration data associated with resource pool 316. This configuration data specifies at least the VMs included each resource pool, and any resource settings corresponding thereto, e.g., central processing unit (CPU) and memory limitations, shares, and reservations of the resource pool.

At step 426, snapshot client 116 queries VM management center 102 for compute resource configuration data associated with virtualized computer inventory 300, e.g., configuration data associated with compute resource 314. Compute resource configuration data is pertinent to the creation of a cluster and/or a host when reconstructing virtualized computer inventory 300 in order to reflect specific hardware configurations associated therewith.

At step 428, snapshot client 116 queries VM management center 102 for networking configuration data associated with virtualized computer inventory 300, e.g., configuration data associated with network 328. The networking configuration data specifies at least port groups and network shaping settings.

At step 430, snapshot client 116 queries VM management center 102 for datastore configuration data associated with virtualized computer inventory 300, e.g., configuration data associated with datastore 334. The datastore configuration data specifies at least input/output (IO) policies associated with each datastore included in virtualized computer inventory 300.

In addition, at step 431, snapshot client 116 queries VM management center 102 for any additional data that is required to perform a reconstruction of virtualized computer inventory 300. Finally, at step 432, snapshot client 116 stores the queried configuration data as inventory configuration data in memory 210.

Referring now back to FIG. 4A, at step 434, snapshot client 116 initializes a process to determine security associated with the inventory. At step 436, illustrated in FIG. 4D, snapshot client 116 queries VM management center 102 for all of the permissions defined within virtualized computer inventory 300. In one embodiment, these permissions are hierarchical, and snapshot client 116 collects all permissions and then maps them to according to their placement within virtualized computer inventory 300. For example, if a given permission applies to data center 306 and all VMs included therein, this information is stored so that, during reconstruction of virtualized computer inventory 300, the permission can be applied to a restored data center 306, the permission indicating that it also applies to all child VMs of data center 306.

At step 438, snapshot client 116 queries VM management center 102 and collects all of the roles defined within virtualized computer inventory 300, where each role belongs to one or more permissions. At step 440, snapshot client 116 stores the permissions and roles as inventory security data in memory 210.

Referring now back to FIG. 4A, at step 442, snapshot client 116 creates an inventory snapshot data structure that encapsulates the inventory relational data, the inventory configuration data, and the inventory security data. In one embodiment, the inventory relational data is processed to be represented using a linked list. More specifically, each node in the linked list represents a different entity in the virtualized computer inventory 300, where each edge that links two node entities represents the relationship between the two node entities. Accordingly, the linked list may be used to facilitate the reconstruction process described below in conjunction with FIG. 5A. Finally, at step 444, snapshot client 116 persists the data structure to one or more data files, and method 400 ends.

Thus, upon completion of the steps in method 400, the one or more data files include all information required to generate code that, when executed, reconstructs virtualized computer inventory 300 in the same or another VM management center 102. In one embodiment, reconstructing an inventory is performed via a two-phase process. The first phase involves parsing a snapshot of virtualized computer inventory 300 and generating code for reconstructing virtualized computer inventory 300 in whole, or in part. The second phase involves executing the code to reconstruct virtualized computer inventory 300. In one embodiment, the code is generated in a format that is executable by software that possesses the security rights to reconstruct virtualized computer inventory 300 within VM management center 102. One example of such software is PowerCLI for VMware vSphere® available from VMware, Inc. of Palo Alto, Calif., or one of a variety of other suitable command-line interpreter systems.

Several advantages are realized when using this two-phase process and generating code instead of actively executing the reconstruction process. For example, the code is distributable to multiple administrators so that each administrator can easily reconstruct virtualized computer inventory 300. In another example, the code is modifiable to, when executed, cause the reconstruction of only a portion of virtualized computer inventory 300 (e.g., only reconstructing a cluster as needed). In yet another example, the code is modifiable to, when executed, reconstruct virtualized computer inventory 300 with differently-named entities. Such renaming enables, for example, an administrator to recreate a topology with a different set of entities, e.g., a same hierarchy of a datacenter, cluster and resource pool, but a different set of host machines.

Figure 5A:
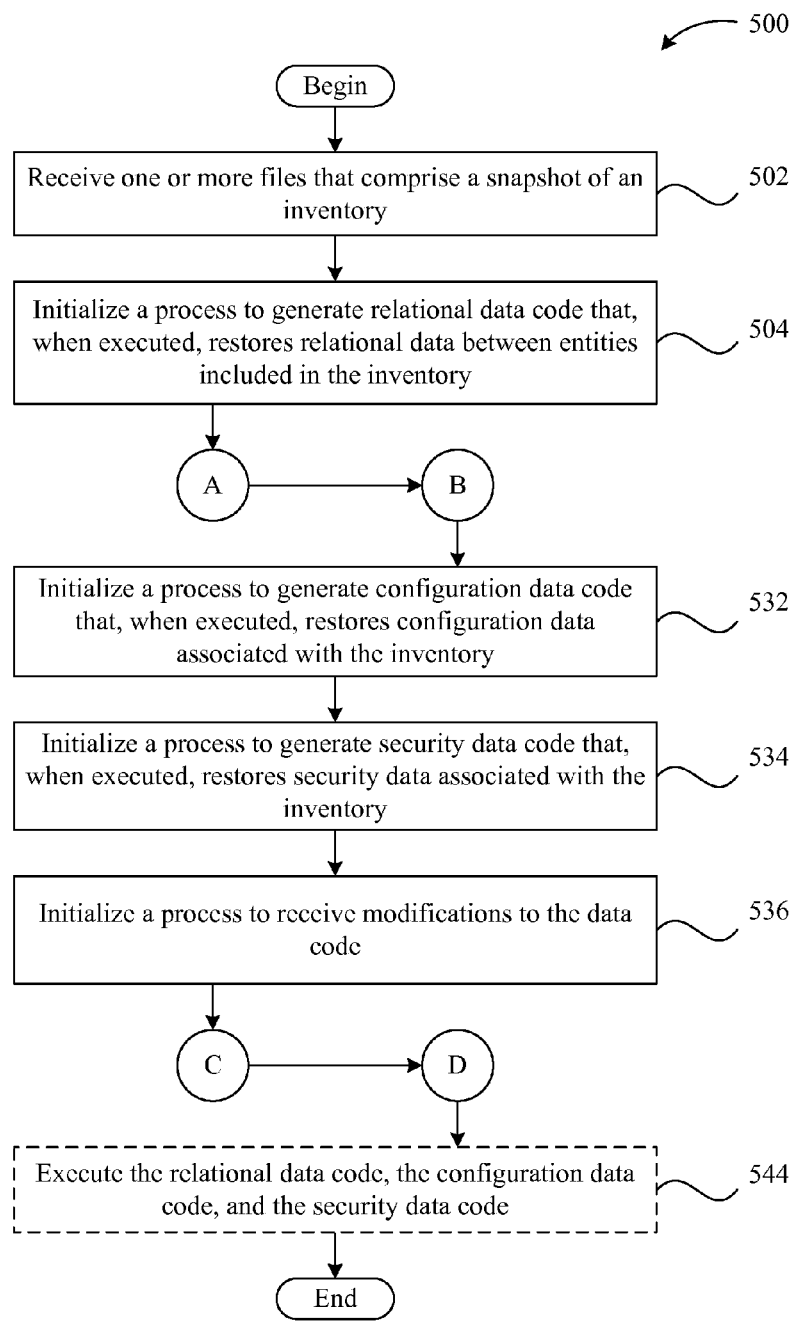
FIG. 5A-5C is a flow diagram of method steps for generating code to reconstruct a virtualized computer inventory, according to one or more embodiments of the present invention.
Figure 5B:
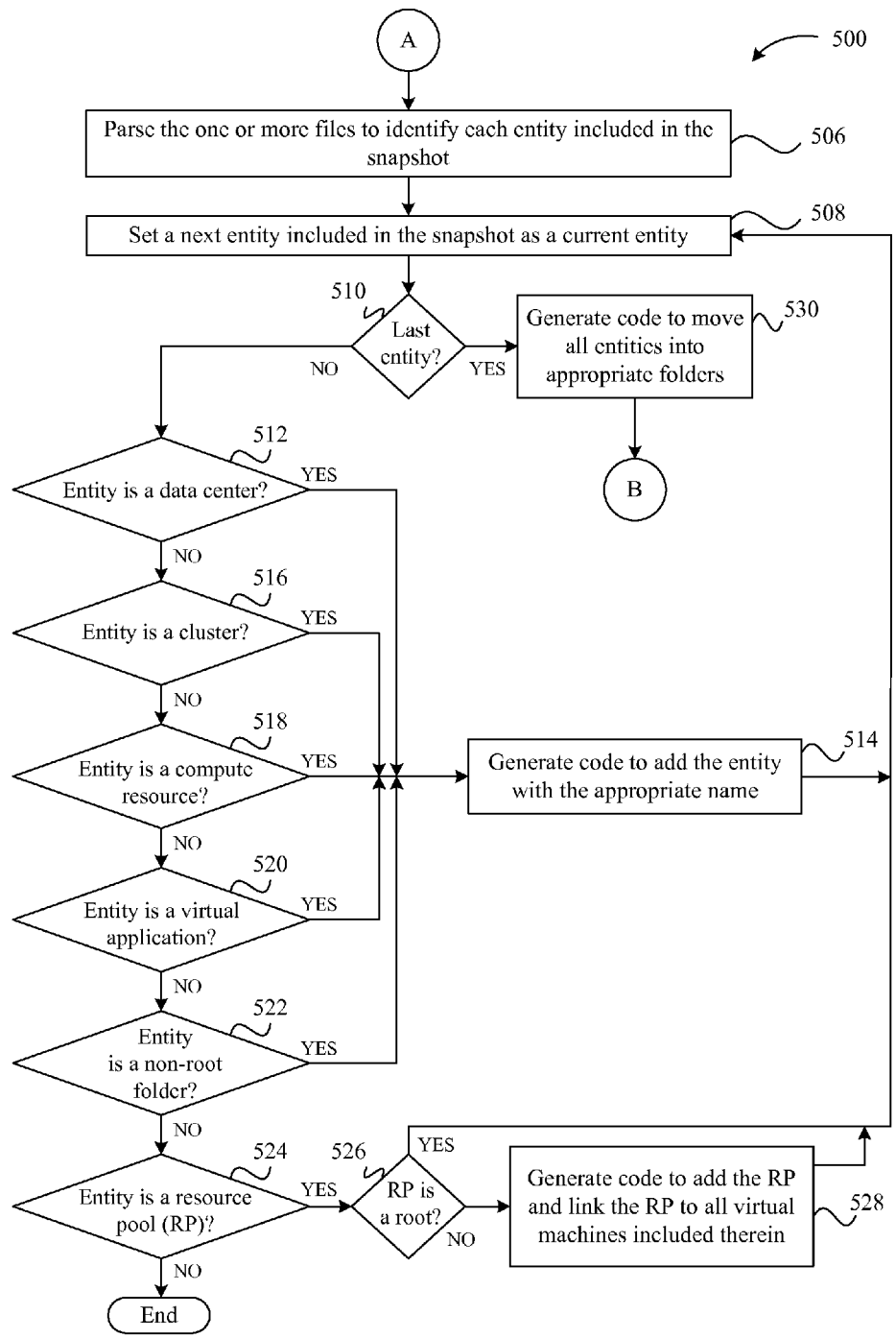
Figure 5C:
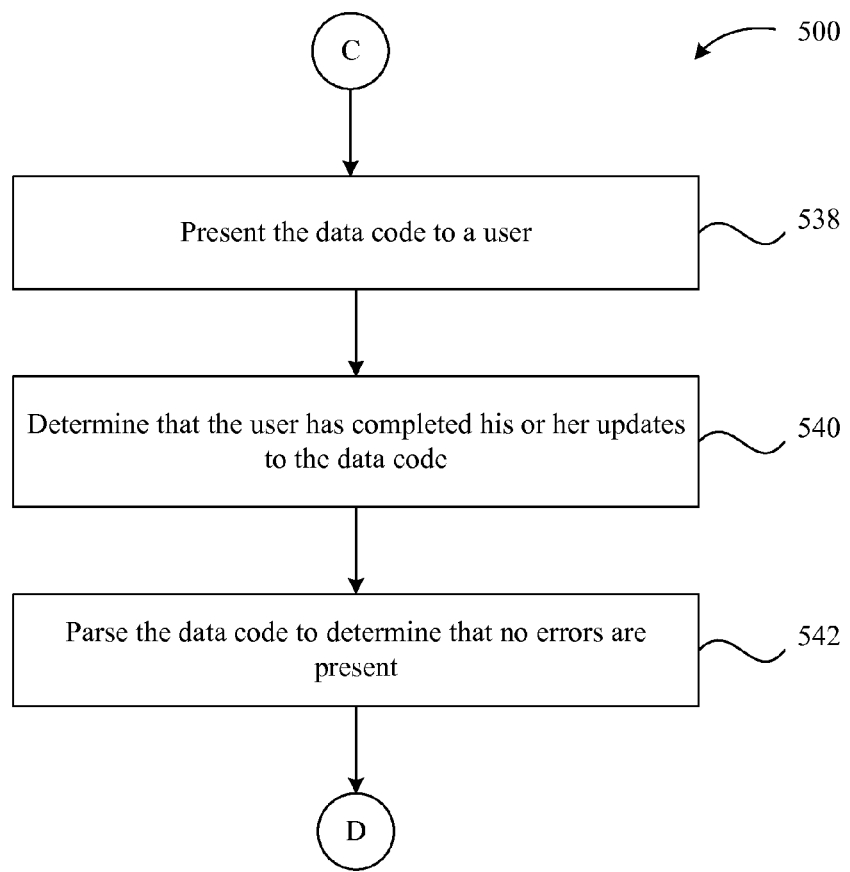

FIG. 5A-5C provide a flow diagram of a method 500 for generating code to reconstruct virtualized computer inventory 300, according to one or more embodiments of the present invention. Although the method steps are described in conjunction with the systems of FIGS. 1-4, persons skilled in the art will understand that any system configured to perform the method steps is within the scope of the invention.

As shown, method 500 begins at step 502, where snapshot client 116 receives one or more files (i.e., the files generated at step 444 in FIG. 4A) that comprise a snapshot of virtualized computer inventory 300. At step 504, snapshot client 116 initializes a process to generate relational data code that, when executed, restores relational data between entities included in virtualized computer inventory 300.

Referring now to FIG. 5B, at step 506, snapshot client 116 parses the one or more files to identify each entity included in the snapshot. Continuing with the linked list described above in conjunction with FIG. 4A, snapshot client 116 begins at the root of the linked list and identifies each entity by traversing the nodes and edges included in the linked list in a parent to child fashion. Accordingly, at step 508, the snapshot client 116 sets a next entity included in the snapshot as a current entity. At step 510, snapshot client 116 determines whether all entities in the snapshot have been parsed. Thus, steps 508 and 510 ensure that each and every entity included in the snapshot are processed by snapshot client 116.

At step 512, snapshot client 116 determines whether the entity is a data center and, if so, at step 514 snapshot client 116 generates code that, when executed, adds the data center to virtualized computer inventory 300 and associates the data center with a corresponding name included in the one or more files.

At step 516, snapshot client 116 determines whether the entity is a cluster and, if so, at step 514 snapshot client 116 generates code that, when executed, adds the cluster to virtualized computer inventory 300 and associates the cluster with a corresponding name included in the one or more files. Because clusters include one or more hosts, snapshot client 116 also generates code that, when executed, adds to virtualized computer inventory 300 the hosts that are included in the cluster, and, further, adds all VMs to virtualized computer inventory 300 that are associated with the hosts. More specifically, in vSphere™, when a host is added to the virtualized computer inventory 300, all VMs that belong to the host are automatically added, thereby eliminating the need to track which VMs belong to which hosts. In addition, the code is supplemented to, when executed, associate the cluster with corresponding configuration settings included in the one or more files.

At step 518, snapshot client 116 determines whether the entity is a compute resource (i.e., a standalone host that is not part of a cluster). Because a compute resource is not part of a cluster, snapshot client 116 also generates code that, when executed, adds the compute resource to virtualized computer inventory 300, and, further, adds all VMs to virtualized computer inventory 300 that are associated with the compute resource, as described above.

At step 520, snapshot client 116 determines whether the entity is a vApp and, if so, at step 514 snapshot client 116 generates code that, when executed, adds the vApp to virtualized computer inventory 300 and associates the vApp with a corresponding name included in the one or more files. In addition, at step 520, snapshot client 116 must consider that the vApp may include other vApps and/or VMs. Thus, snapshot client 116 must also generate code that, when executed, associates the vApp with child vApps or child VMs thereof. However, for this association to succeed, each child VM must already be established within the reconstructed virtualized computer inventory 300, otherwise execution of the code would fail when attempting to create an association between the vApp and a non-existent child VM. These issues, however, are avoided as described below.

With respect to child vApps: because snapshot client 116 traverses the linked list in a parent to child fashion, when a child vApp is reached, code to generate the parent vApp has, inherently, already been generated. Further, since execution of the code occurs in a sequential fashion, when execution of code to add the child vApp occurs, execution of code to add the parent vApp has already been executed. As a result, each child vApp can be readily associated with its parent. With respect to child VMs, since a vApp is a child to a cluster or a compute resource, and since snapshot client 116 traverses the linked list in a parent to child fashion, code to generate the parent cluster or compute resource—and any VMs associated therewith—has already been generated at step 516 or at step 518. Therefore, the code generated at step 520 executes after any child VMs associated with this vApp have, inherently, already been added to the inventory and can be readily associated with the vApp.

At step 522, snapshot client 116 determines whether the entity is a non-root folder. In vSphere™, all virtualized computer inventories consist of a number of default root folders, which are implicitly added when virtualized computer inventory 300 is reconstructed. For example, a root network folder is added whenever a data center is added, where a parent to the root network folder is a data center. There are also datastore folders, host folders, and VM folders, where a root folder of each type is implicitly added to virtualized computer inventory 300 when the data center is added to virtualized computer inventory 300. When snapshot client 116 encounters a root folder, snapshot client 116 generates no code. However, when snapshot client 116 encounters a non-root folder, snapshot client 116 generates code that, when executed, adds the folder to virtualized computer inventory 300 and associates the folder with a corresponding name included in the one or more files.

As previously described herein, a folder entity may include one or more VMs. As also previously described, each VM must be associated with either a compute resource or a cluster, and that a parent to a VM is typically a VM folder. Accordingly, if snapshot client 116 encounters a VM folder in the linked list before snapshot client 116 encounters the compute resource or the cluster associated with the VMs included in the VM folder, then no code for reconstructing the VMs has been generated. As a result, the VMs cannot be moved into the appropriate VM folder. Snapshot client 116 avoids this situation, however, by moving VMs into folders as part of a second traversal of the linked list, after all VMs are guaranteed to have been added to the inventory. This second traversal is described in further detail below at step 530.

At step 524, snapshot client 116 determines whether the entity is a resource pool and, if so, at step 526, snapshot client 116 further determines whether the resource pool is a root resource pool. As previously described herein, in vSphere™, a root resource pool is added by default whenever a cluster or a compute resource is added to virtualized computer inventory 300. However, if the entity is not a root resource pool, then, at step 528, snapshot client 116 adds the resource pool and associates the resource pool with any VMs included therein. By similar reasoning as for the vApps described above in step 520, method 500 guarantees that the VMs included in a resource pool already exist in virtualized computer inventory 300 when the resource pool is added to virtualized computer inventory 300. In addition, because resource pools can be nested, snapshot client 116 also places the resource pool under, if any, an appropriate parent resource pool. Again, because the linked listed is traversed in a parent to child fashion, method 500 guarantees that the parent resource pool will already be added to virtualized computer inventory 300. Finally, snapshot client 116 modifies the resource pool, if necessary, to match any corresponding resource pool settings included in the snapshot.

When snapshot client 116 has traversed all nodes included in the linked list, snapshot client 116 executes step 530 and generates code that, when executed, causes all entities to be moved into their appropriate folders. As previously described, the code generated at step 530 must be executed subsequent to the code generated throughout the first traversal of the linked list. This guarantees that, when the code to move the entities into their appropriate folders is executed, each of the entities has already been added to the reconstructed virtualized computer inventory 300. A similar constraint applies to hosts, networks, and datastores. To perform step 530, snapshot client 116 traverses the linked list to determine, if any, a parent folder for each entity, and generates code that, when executed, moves the entity into its corresponding parent folder. When an entity is added to a virtualized computer inventory, it is implicitly added to the root folder for its type. For example, VMs are automatically added to a root VM folder for a given data center. Therefore, if the parent folder for an entity is a root folder, snapshot client 116 foregoes generating code to move the entity into a parent folder, thereby increasing efficiency.

Referring now back to step FIG. 5A, at step 532, snapshot client 116 initializes a process to generate configuration data code that, when executed, restores configuration data associated with the inventory.

At step 534, snapshot client 116 initializes a process to generate security data code that, when executed, restores security data associated with the inventory, i.e., permissions and roles. Because permissions can be propagated, snapshot client 116 is not required to add permissions for each entity in virtualized computer inventory 300. Instead, snapshot client 116 generates code to add each permission at a highest possible level in virtualized computer inventory 300 and then sets the permissions to propagate accordingly. For example, if a permission corresponds to a data center and all of the VMs included therein, snapshot client 116 is not required to explicitly associate each included VM with a permission. Instead, snapshot client 116 generates code that, when executed, associates the permission with the data center and sets a "propagate" attribute accordingly. However, if a permission exists only for a particular VM, snapshot client 116 explicitly associates the VM with the permission.

At step 536, snapshot client 116 initializes a process to receive modifications to the data code. At step 538, snapshot client 116 presents the data code to a user. For example, snapshot client 116 may display, to the user, the data code in a text editor. At step 540, snapshot client 116 determines that the user has completed his or her updates to the data code. This may be triggered, for example, by detecting that the text editor is closed and that the data code has been updated. Such updates involve, for example, removing portions of code that generate a specific portion of virtualized computer inventory 300. In another example, the updates involve modifying the names of one or more entities included in virtualized computer inventory 300, which is efficiently accomplished by searching for and replacing specific text within the data code. In yet another example, the data code may include markers that are associated with specific portions of code, e.g., code associated with the reconstruction of resource pools. Advantageously, a user may select one or more of the markers so that only the code segments included in the data code and associated with the selected markers are executed by the snapshot client 116, as described below in step 544. Accordingly, the user is able to reconstruct specific sub-portions of the virtualized computer inventory 300.

At step 542, snapshot client 116 parses the data code to determine whether the updates—if any—have established errors in the data code. Optionally, snapshot client 116 may indicate to the user that his or her updates have damaged the data code.

Finally, at optional step 544, snapshot client 116 executes the relational data code, the configuration data code, and the security data code to reconstruct virtualized computer inventory 300. In one embodiment, snapshot client 116 routes the code to VM management center 102 for execution. Accordingly, any updates made to the relational data code, the configuration data code, and/or the security data code are reflected when the virtualized computer inventory 300 is reconstructed, as described below in conjunction with FIG. 6.

Figure 6:
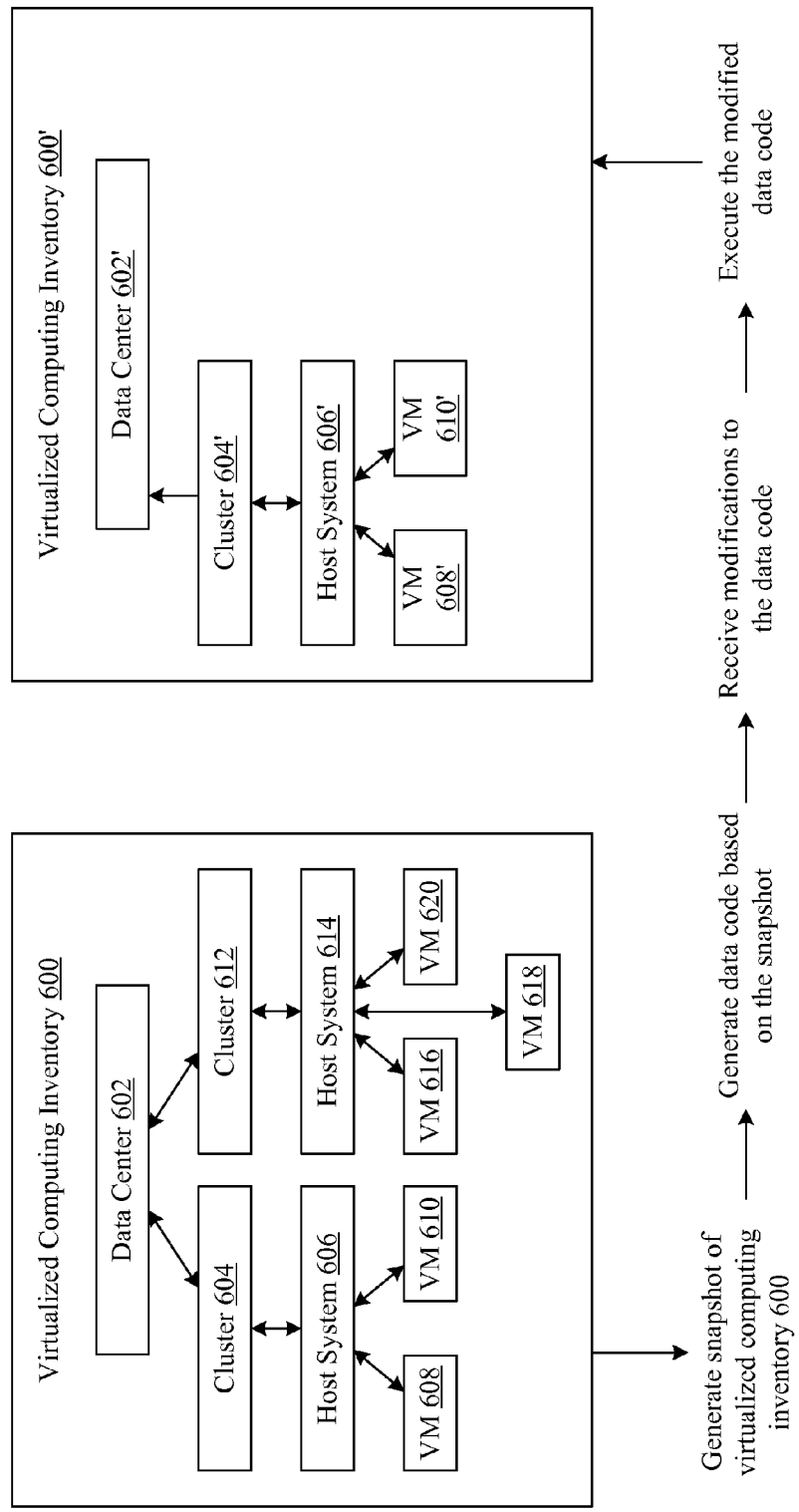
FIG. 6 depicts an exemplary partial reconstruction operation of a virtualized computer inventory, according to one embodiment of the present invention.

FIG. 6 depicts an exemplary partial reconstruction operation of a virtualized computer inventory 600, according to one embodiment of the present invention. As illustrated, virtualized computer inventory 600 includes data center 602, where data center 602 includes cluster 604 and cluster 612. Here, cluster 604 includes host system 606, which includes VM 608 and VM 610. Further, cluster 612 includes host system 614, where host system 614 includes VM 616, VM 618, and VM 620.

To perform the partial reconstruction of inventory 600, a snapshot of virtualized computer inventory 600 is first generated according to method 400 described above in conjunction with FIG. 4A. Next, data code is generated based on the snapshot and optionally edited by a user according to method 500 described above in conjunction with FIG. 5A. In the example shown in FIG. 6, portions of the data code that would otherwise, when executed, cause cluster 612 and all entities included therein to be reconstructed, are removed from the data code. Accordingly, reconstructed virtualized computer inventory 600' does not include cluster 612, as intended by the user.

As set forth above, one or more embodiments of the invention set forth a programmatic method for archiving and reconstructing a virtualized computer inventory, in whole or in part. Advantageously, such archiving and reconstruction may be used, e.g., for disaster recovery, where periodic archiving is executed such that multiple versions of a virtualized computing inventory may be immediately reconstructed. First, a VM management center is queried to retrieve and store relationships between various entities, the permissions and roles associated with those entities, and the configuration settings of those entities. From this stored data, code for reconstructing the entire inventory of the virtualized computer system is generated. The code is generated in user-editable format to enable administrators to customize the inventory that is reconstructed from the code. The archiving and storing further allows efficient creation of production inventories from development inventories.

In some cases, a reconstruction of an inventory may undergo one or more errors that result in the reconstructed inventory not being identical to the original inventory. Such errors may occur, for example, if one or more portions of the code used in the reconstruction fail to execute properly. Therefore, embodiments of the invention also include a programmatic method for verifying that the reconstructed inventory is identical to the original inventory. These embodiments are described in further detail below in conjunction with FIGS. 7, 8-9 and 10A-10B.

Figure 7:
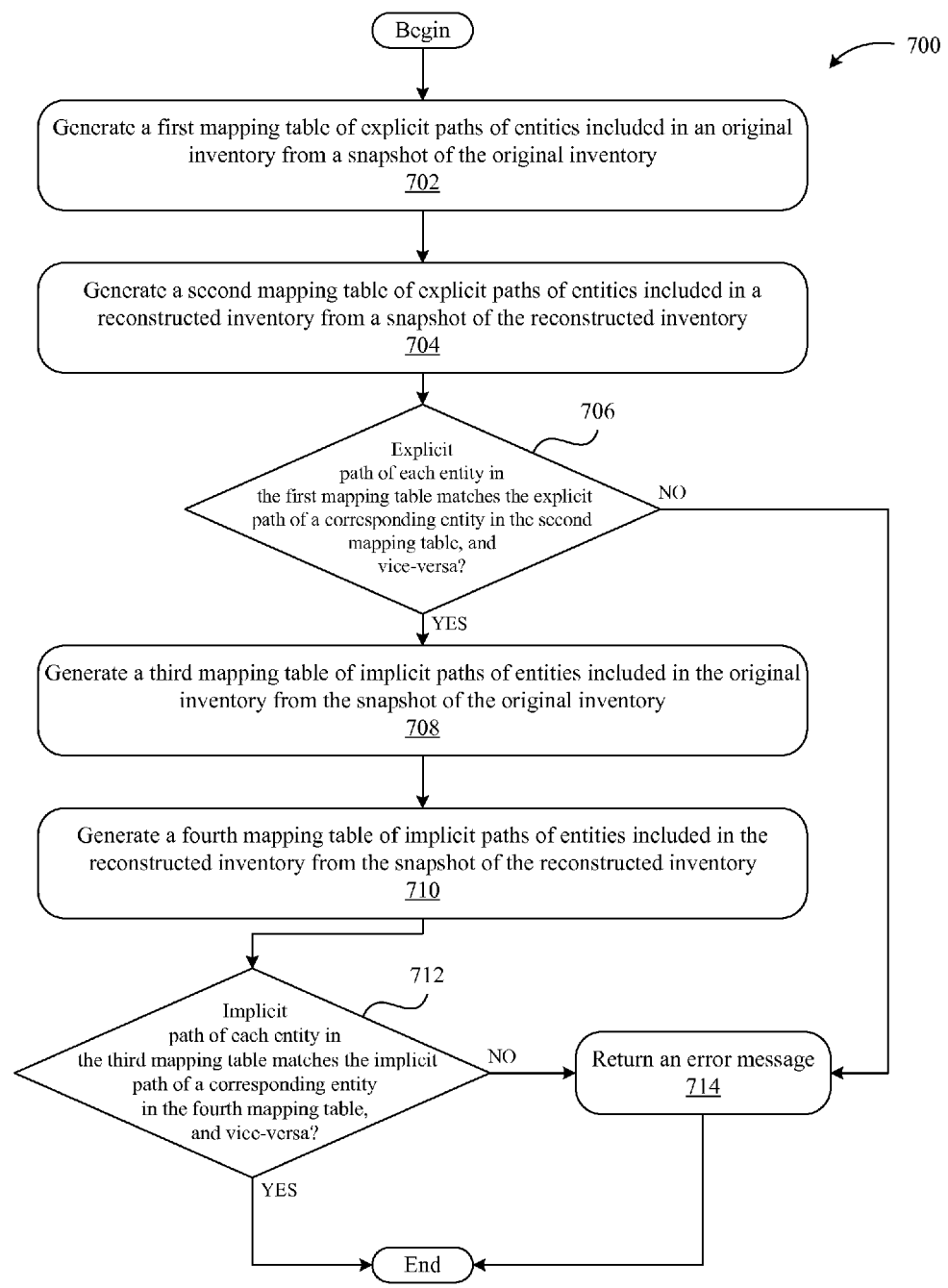
FIG. 7 illustrates a flow diagram of a method for verifying that the topology settings of entities included in a reconstructed inventory match the topology settings of corresponding entities included in an original inventory, according to one embodiment of the present invention.

FIG. 7 is a flow diagram of method steps 700 for verifying that the topology settings of entities included in the reconstructed inventory match the topology settings of corresponding entities included in the original inventory, according to one embodiment of the present invention. In particular, method steps 700 include steps to match the explicit paths of entities in the inventory and the implicit paths of the entities in the inventory, which are described above in detail in conjunction with FIGS. 3-4 Although the method steps are described in conjunction with the systems of FIGS. 1-2, persons skilled in the art will understand that any system configured to perform the method steps is within the scope of the invention.

As shown, method 700 begins at step 702, where snapshot client 116 generates a first mapping table of explicit paths of entities included in the original inventory from a snapshot of the original inventory. In one embodiment, to create the first mapping table, snapshot client 116 accesses the snapshot of the source inventory in which entities are organized as a linked list and traverses the linked list, as described above in conjunction with FIG. 5A. As described above, each node in the linked list represents a different entity in the source inventory, and each edge that links two nodes represents the topological path between the two nodes.

The structure of the first mapping table is now described. Each entry in the first mapping table corresponds to a different entity and includes a first field that stores a complete path to the entity and a second field that stores configuration data associated with the entity. For example, referring to FIG. 3, the explicit path of a VM named "foo" is "/Data_Center_A/VM_Folder_A/foo", and the explicit path of a resource pool named "RP_1" is "/Data_Center_A/Host_Folder_A/Cluster_A/RP_1. An example of the first mapping table is illustrated in Table 1.

TABLE 1

| Explicit Path | Entity Data |
| --- | --- |
| /Data_Center_A/VM_Folder_A/foo | {VM:foo} |
| /Data_Center_A/VM_Folder_A/bar | {VM:bar} |
| /Data_Center_A/VM_Folder_B/zoo | {VM:zoo} |
| /Data_Center_A/Host_Folder_A/Cluster_A/RP_1 | {RP:RP_1} |

At step 704, snapshot client 116 generates a second mapping table of explicit paths of entities included in the reconstructed inventory from a snapshot of the reconstructed inventory. An example of the second mapping table is illustrated in Table 2, where the contents of Table 2 are the same as Table 1, but are ordered differently.

TABLE 2

| Explicit Path | Entity Data |
| --- | --- |
| /Data_Center_A/VM_Folder_A/foo | {VM:foo} |
| /Data_Center_A/Host_Folder_A/Cluster_A/RP_1 | {RP:RP_1} |
| /Data_Center_A/VM_Folder_A/bar | {VM:bar} |
| /Data_Center_A/VM_Folder_B/zoo | {VM:zoo} |

At step 706, snapshot client 116 determines whether the explicit path of each entity in the first mapping table matches the explicit path of a corresponding entity in the second mapping table, and vice-versa. In one embodiment, to execute step 706, snapshot client 116 parses the first mapping table in a contiguous, row-by-row manner, and locates for each row in the first mapping table a corresponding row in the second mapping table. If snapshot client 116 determines that, for one or more rows in the first mapping table, no corresponding row is included in the second mapping table, then method 700 proceeds to step 714, where snapshot client 116 returns an error message. In some embodiments, the error message may include a detailed description of any discrepancies identified by snapshot client 116 at step 706. For example, if Table 2 were to instead include an explicit path of "/Data_Center_A/VM_Folder_A/zoo" for the VM "zoo", then it is determined that the VM "zoo" was placed into the incorrect VM folder "VM_Folder_A" in the reconstructed inventory. As indicated above, snapshot client 116 also determines whether the explicit path of each entity in the second mapping table matches the explicit path of each corresponding entity in the first mapping table. In this way, snapshot client 116 may effectively determine whether additional entities are improperly included in the reconstructed inventory, e.g., a resource pool that was added twice as a result of erroneous reconstruction code being executed. Moreover, the techniques described above account for each of the linked lists being ordered differently, which may occur as a result of the snapshot of the original inventory and the snapshot of the reconstructed inventory being generated at different times, or according to varying techniques. Assuming, therefore, that snapshot client 116 determines that the explicit path of each entity in the first mapping table matches the explicit path of each corresponding entity in the second mapping table, and vice-versa, then method 700 proceeds to step 708.

In some cases, an entity may not have an explicit path to another entity. For example, a virtual machine that is not included in a VM folder (i.e., an explicit parent) may be included in a vApp (i.e., an implicit parent). As described above, snapshot client 116 is configured to also analyze the implicit path of each entity. Accordingly, at step 708, snapshot client 116 generates a third mapping table of implicit paths of entities included in the original inventory from the snapshot of the original inventory.

In one embodiment, snapshot client 116 generates both the third mapping table and a fourth mapping table (described below at step 710) in a manner similar to method steps 702-704 described above, respectively. In one example, in a virtualized computing inventory managed by vSphere™, the explicit parent for a VM is a VM folder, whereas the implicit parent for a VM can be a resource pool or a vApp. For example, snapshot client 116, when encountering a node that is representative of a VM, may determine that the implicit path of the VM is a resource pool named "RP_1". An example of the third mapping table is illustrated in Table 3.

TABLE 3

| Implicit Path | Entity Data |
| --- | --- |
| /Data_Center_A/VM_Folder_A/foo | {RP:RP_1} |
| /Data_Center_A/VM_Folder_A/bar | {RP:RP_1} |
| /Data_Center_A/VM_Folder_A/zoo | {RP:RP_2} |

At step 710, snapshot client 116 generates a fourth mapping table of implicit paths of entities included in the reconstructed inventory from the snapshot of the reconstructed inventory.

TABLE 4

| Implicit Path | Entity Data |
| --- | --- |
| /Data_Center_A/VM_Folder_A/foo | {RP:RP_1} |
| /Data_Center_A/VM_Folder_A/zoo | {RP:RP_2} |
| /Data_Center_A/VM_Folder_A/bar | {RP:RP_1} |

At step 712, snapshot client 116 determines whether the implicit path of each entity in the third mapping table matches the implicit path of a corresponding entity in the fourth mapping table, and vice-versa. If, at step 712, snapshot client 116 determines that the implicit path of each entity in the third mapping table matches the implicit path of a corresponding entity in the fourth mapping table, then method 700 proceeds to step 714. Otherwise, method 700 proceeds to step 714, where snapshot client 116 returns an error message that indicates any discrepancies identified at step 712.

As described above, method steps 708-712 involve verifying implicit relationships of entities between both the original inventory and the reconstructed inventory. It is noted that, even if an entity does not have an explicit relationship, method steps 708-712 are nonetheless executed by snapshot client 116 to perform an implicit relationship comparison.

The foregoing techniques involve verifying topology settings of all entities included in the reconstructed inventory match the topology settings of all corresponding entities included in the original inventory. However, in some embodiments, snapshot client 116 may be configured to verify only a subset of entities included in the reconstructed inventory against a subset of corresponding entities included in the original inventory.

Figure 8:
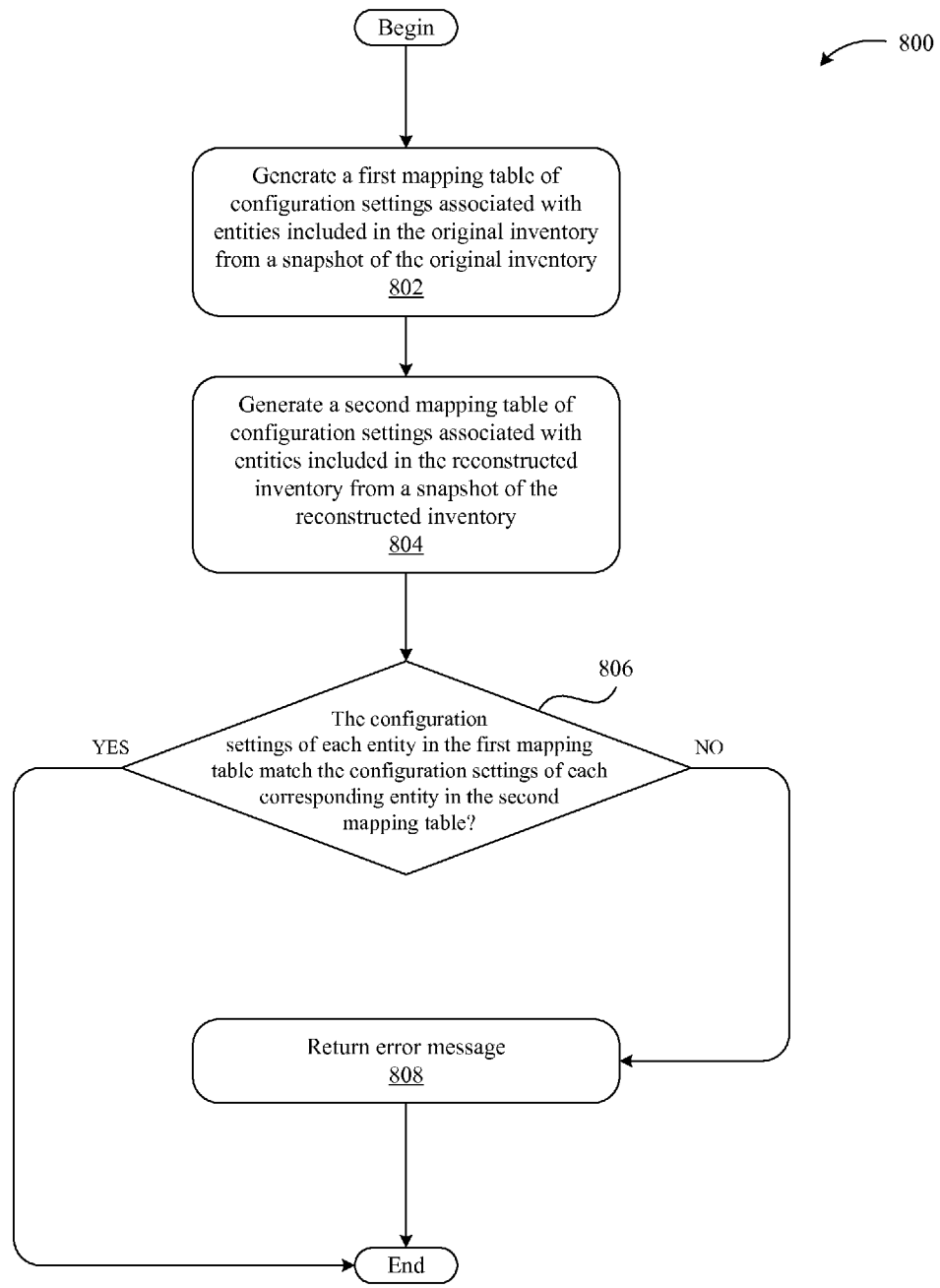
FIG. 8 illustrates a flow diagram of a method for verifying that the configuration settings of entities included in a reconstructed inventory match the configuration settings of corresponding entities included in an original inventory, according to one embodiment of the present invention.

FIG. 8 illustrates a flow diagram of method steps 800 for verifying that the configuration settings of entities included in the reconstructed inventory match the configuration settings of corresponding entities included in the original inventory, according to one embodiment of the present invention. Although the method steps are described in conjunction with the systems of FIGS. 1-2, persons skilled in the art will understand that any system configured to perform the method steps is within the scope of the invention.

As shown, method 800 begins at step 802, where snapshot client 116 generates a first mapping table of configuration settings for entities included in the original inventory from a snapshot of the original inventory. In one embodiment, snapshot client 116 may, in lieu of generating the first mapping table of configuration settings, refer back to the first mapping table of explicit paths generated at step 702 in FIG. 7, which includes, in the second column, configuration data associated with each entity in the original inventory.

At step 804, snapshot client 116 generates a second mapping table of configuration settings for entities included in the reconstructed inventory from a snapshot of the reconstructed inventory. Again, snapshot client 116 may, in lieu of generating the second mapping table of configuration settings, refer back to the second mapping table of explicit paths generated at step 702 in FIG. 7, which includes, in the second column, configuration data associated with each entity in the reconstructed inventory.

At step 806, snapshot client 116 determines whether the configuration settings of each entity in the first mapping table match the configuration settings of each corresponding entity in the second mapping table. In one example, a cluster entity may be associated with high-availability settings and power-management settings that are included in the configuration data associated with the cluster.

In one embodiment, to execute step 806, snapshot client 116 parses the first mapping table in a contiguous, row-by-row manner, and locates for each row a corresponding row in the second mapping table. Snapshot client 116 then compares the configuration data of each entity. In some embodiments, snapshot client 116 implements a comparator interface that parses each configuration attribute to ensure that they completely match. For example, snapshot client 116 may verify each attribute between a VM in a reconstructed inventory and a VM in an original inventory while ignoring a unique ID associated with the VM, since the unique IDs of the VMs would likely be different across the reconstructed inventory and the original inventory. In some embodiments, snapshot client 116 is configured to also compare the configuration settings of each entity in the second mapping table to make sure they match the configuration settings of each corresponding entity in the first mapping table, to ensure that additional configuration settings were not erroneously established when reconstructing the reconstructed inventory.

In some cases, configuration data of an entity may require snapshot client 116 to execute analysis that extends beyond the configuration data itself. For example, a vApp may be composed of two or more VMs, where the vApp relies on a particular bootup order of the two or more VMs that is specified in the vApp's configuration settings. Thus, snapshot client 116 is required to verify not only the bootup order configuration of the VMs included in the vApp, but also to verify that the VMs are included in the reconstructed inventory and are in the appropriate location(s).

Consider, for example, that the vApp is composed of two VMs: a first VM with a unique identifier "vm-123" and named "foo", and a second VM with a unique identifier "vm-456" and named "bar". Further, consider that, in the original inventory, the corresponding vApp is composed of two VMs: a first VM with a unique identifier "vm-245" and named "foo", and a second VM with a unique identifier "vm-576" and named "bar". To compare the configuration settings of the entities across the original inventory and the reconstructed inventory, snapshot client 116 may use the unique identifier of each VM to look up the VM's explicit path, which is stored in Table 1 and/or Table 2. Accordingly, because snapshot client 116 has access to the explicit paths of each VM included the vApp, snapshot client 116 can also verify that the VMs are included in the reconstructed inventory, thereby ensuring that the vApp will be able to boot properly. Any other configuration data of other types of entities that utilize entity IDs is verified by snapshot client 116 in a similar manner.

Referring back now to step 806, if snapshot client 116 determines that the configuration settings of each entity in the first mapping table match the configuration settings of each corresponding entity in the second mapping table, then method 800 ends. Otherwise, at step 808, snapshot client 116 returns an error message according to the techniques described herein.

Figure 9:
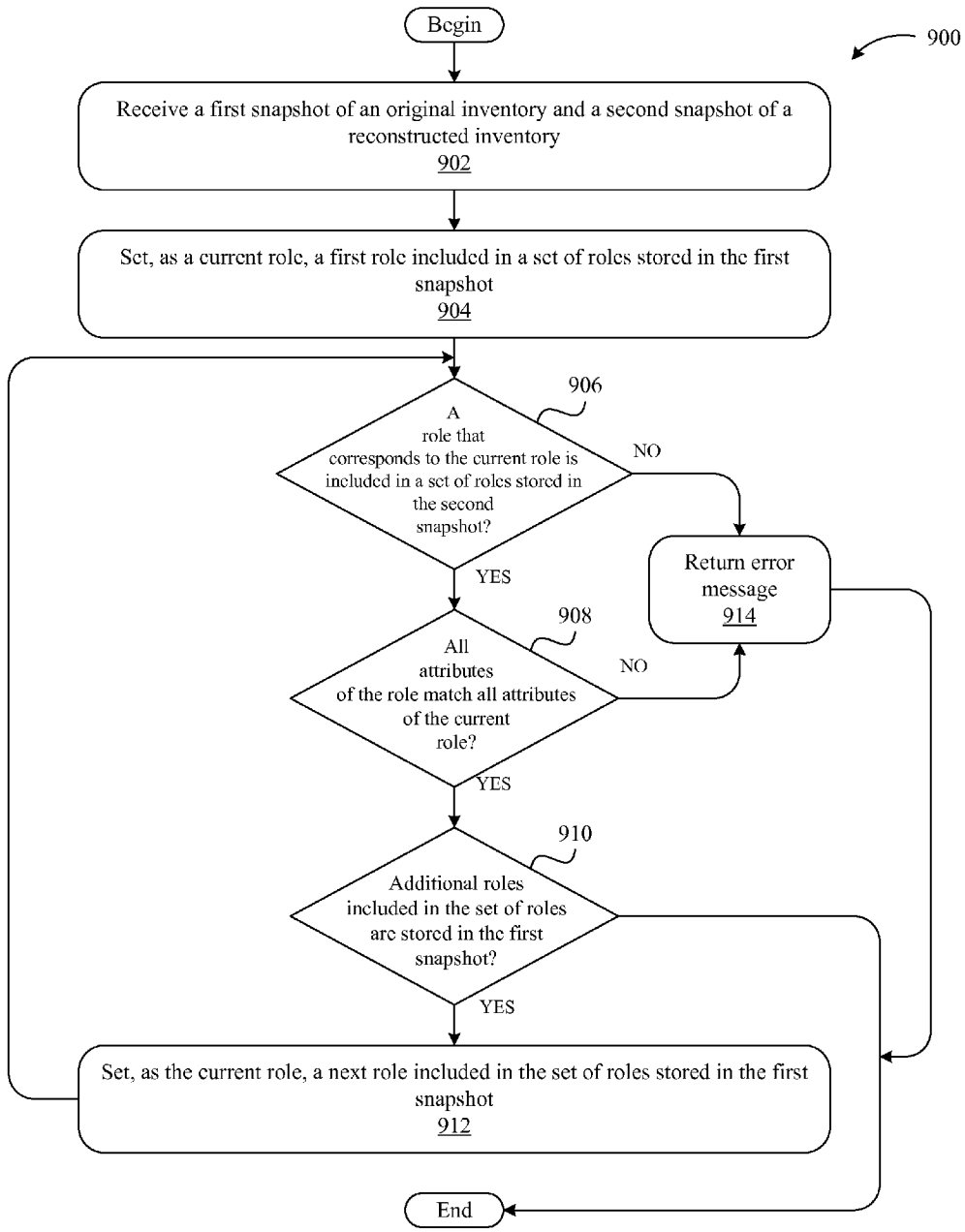
FIG. 9 illustrates a flow diagram of a method for verifying that the roles and permissions associated with a reconstructed inventory match the roles and permissions associated with an original inventory, according to one embodiment of the present invention.

FIG. 9 illustrates a flow diagram of method steps 900 for verifying that the roles and permissions associated with the reconstructed inventory match the roles and permissions associated with the original inventory, according to one embodiment of the present invention. Although the method steps are described in conjunction with the systems of FIGS. 1-2, persons skilled in the art will understand that any system configured to perform the method steps is within the scope of the invention. As shown, method 900 begins at step 902, where snapshot client 116 receives the first snapshot of the original inventory and the second snapshot of the reconstructed inventory.

In one embodiment, both the snapshot of the original inventory and the snapshot of the reconstructed inventory include a set of roles, where each role defines one or more users allowed to perform the role, a description of the role (i.e., a permission), and a set of one or more entities to which the role applies. For example, in the snapshot of the reconstructed inventory, a role included in the set of roles may specify that a given user "user A" may power-on VM "VM_B". In this example, the role allows the power-on operation to be applied to entity "VM_B" by user "user A."

To verify that the set of roles included in the original inventory matches the set of roles included in the reconstructed inventory, at step 904, snapshot client 116 sets, as a current role, a first role included in a set of roles stored in the first snapshot.

At step 906, snapshot client determines whether a role that corresponds to the current role is included in a set of roles stored in the second snapshot. In one embodiment, each role is associated with an identifier that is unique to the inventory in which the role is included, e.g., the reconstructed inventory. Thus, similar to the mapping between the unique ID of a VM and the name of the VM, there is a mapping between the unique ID of each role and the name of the role. Accordingly, to ensure that the set of roles matches between the original inventory and the reconstructed inventory, snapshot client 116 traverses the unique ID to name mapping of each role to determine whether the basic configuration for each role is the same across the original inventory and the reconstructed inventory, e.g., the one or more users allowed to perform the role, the description of the role, and the set of one or more entities to which the role applies.

If, at step 906, snapshot client 116 determines that a role that corresponds to the current role is included in a set of roles stored in the second snapshot, then method 906 proceeds to step 908. Otherwise, method 900 proceeds to step 914, and snapshot client 116 returns an error message indicating that the set of roles are not equivalent between the original inventory and the reconstructed inventory.

At step 908, snapshot client 116 determines whether all attributes of the role match all attributes of the current role. If, at step 908, snapshot client 116 determines that all attributes of the role match all attributes of the current role, then method 900 proceeds to step 910. Because some roles may apply to a group of entities, and the entities are stored by entity ID, snapshot client 116 is also configured to traverse the entity unique ID to name mapping, as described above in conjunction with FIGS. 7 and 8, and use that name to ensure that the entities referred to by the current role are, in fact, the same entities referred to by the role.

At step 910, snapshot client 116 determines whether additional roles included in the set of roles are stored in the first snapshot. If, at step 910, snapshot client 116 determines that additional roles included in the set of roles are stored in the first snapshot, then method 900 proceeds to step 912.

At step 912, snapshot client 116 sets, as the current role, a next role included in the set of roles stored in the first snapshot. In this way, snapshot client 116 accounts for each of the roles included in the first snapshot, thereby verifying that the reconstructed inventory does, in fact, include the appropriate roles. As described herein, snapshot client 116 may repeat method steps 900 by instead parsing the roles included in the second snapshot and comparing each role to a corresponding role in the first snapshot, which allows snapshot client 116 to identify any roles that should not be included in the reconstructed inventory.

Figure 10A:
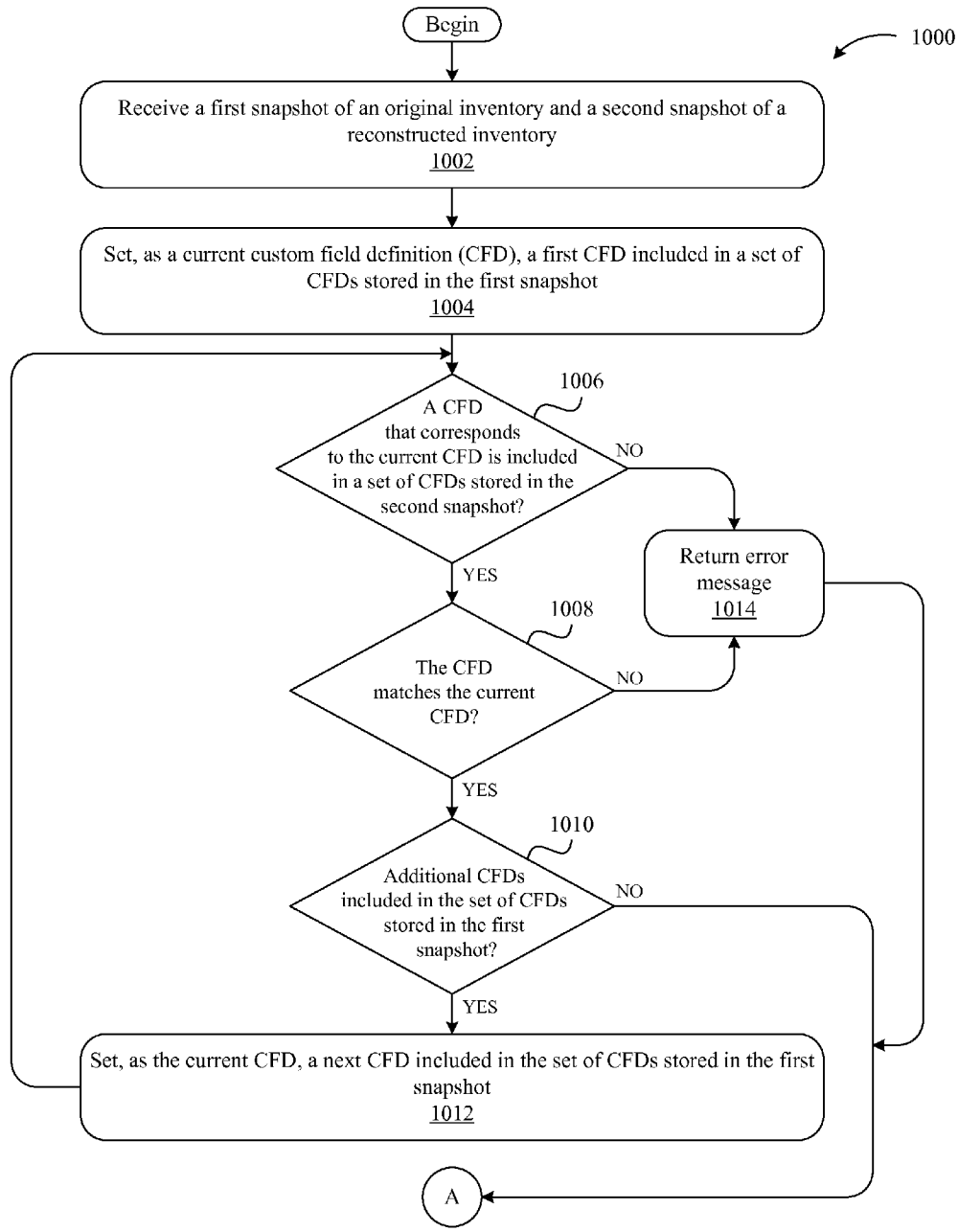
FIGS. 10A-10B illustrate a flow diagram of a method for verifying that the custom fields within a reconstructed inventory match the custom fields within an original inventory, according to one embodiment of the present invention.
Figure 10B:
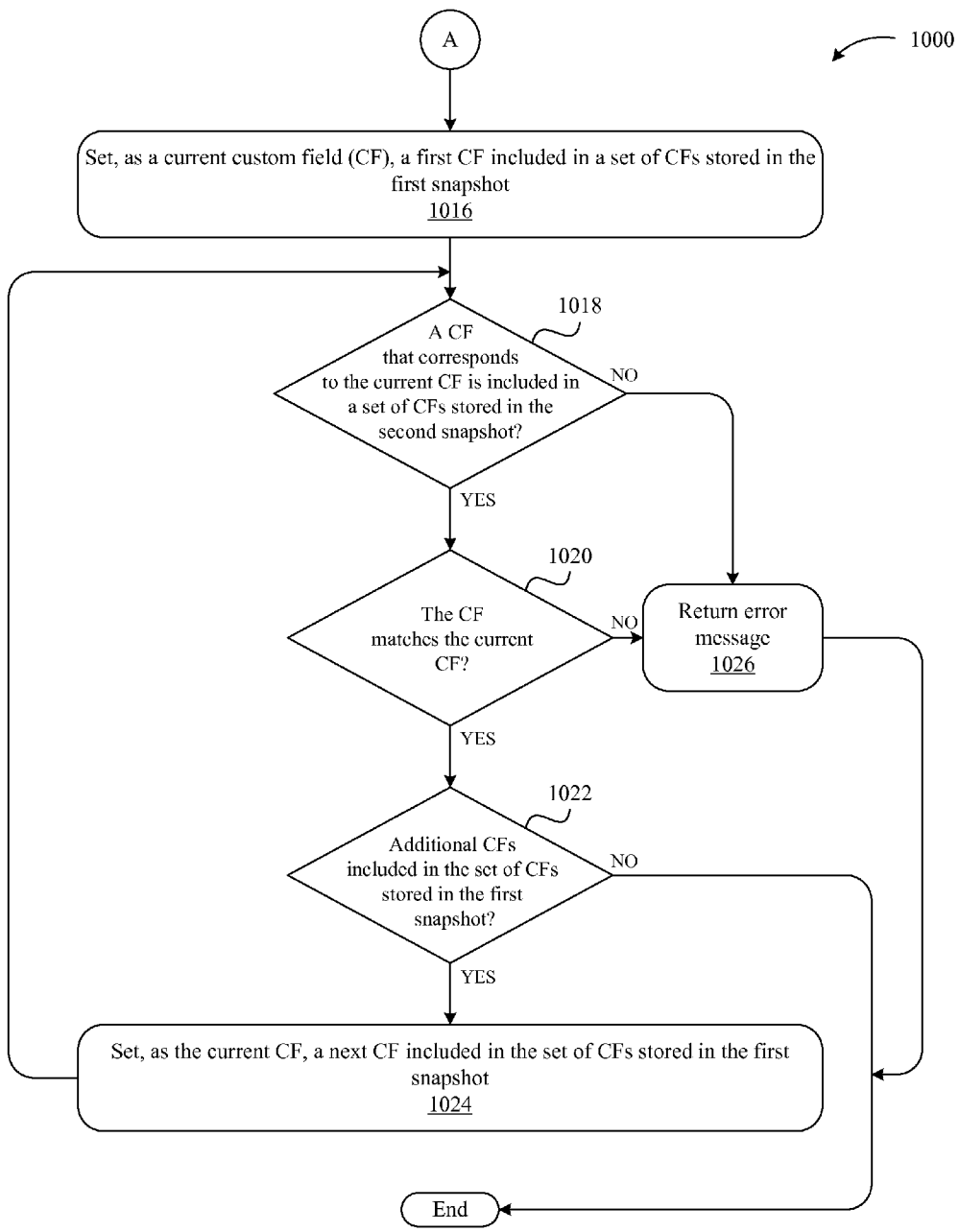

FIGS. 10A-10B illustrate a flow diagram of method steps 1000 for verifying that the custom fields within the reconstructed inventory match the custom fields within the original inventory, according to one embodiment of the present invention. Although the method steps are described in conjunction with the systems of FIGS. 1-2, persons skilled in the art will understand that any system configured to perform the method steps is within the scope of the invention.

In particular, snapshot client 116 is configured to verify the correctness of custom fields according to techniques similar to those described above in conjunction with FIG. 9. More specifically, each of the snapshot of the original inventory and the snapshot of the reconstructed inventory includes a mapping table of custom field definitions to entity types. For example, in vSphere™, the name of a custom field "description" applies to all VMs included in the inventory. Table 5 illustrates an example mapping of custom field definitions to entity types. The first row shows the "Description" custom field, which applies to all entities in the inventory. The second row shows the "Alias" custom field, which applies only to VMs in the inventory.

TABLE 5

| Custom Field Type | Entity Data |
| --- | --- |
| Description | {All Entities} |
| Alias | {VMs} |

Accordingly, each entity includes in its configuration settings a value for the custom field definitions with which the entity is associated. As a result, there exists in each of the first and second snapshots an additional table for mapping entities to the appropriate values for these custom fields. Table 6 illustrates an example of such a mapping.

TABLE 6

| Entity | Custom Field Value(s) |
|---|---|
| {VM:foo} | {Description: "Exch_Server", Alias: "Tom's_DB"} |
| {RP:RP_1} | {Description: "Main Resource Pool"} |

Accordingly, snapshot client 116 is configured to verify that each of the custom field definitions matches across the original inventory and the reconstructed inventory, and that each of the custom field definitions apply to the same entity types, described below in method steps 1002-1014. Snapshot client is also configured to traverse each entity and convert the unique ID associated therewith to the corresponding explicit path in order to ensure that that the values for the custom fields are correct, which is described below in method steps 1016-1026.

As shown, method 1000 begins at step 1002, where snapshot client 116 receives a first snapshot of an original inventory and a second snapshot of a reconstructed inventory. At step 1004, snapshot client 116 sets, as a current custom field definition (CFD), a first CFD included in a set of CFDs stored in the first snapshot. At step 1006, snapshot client 116 determines that a CFD that corresponds to the current CFD is included in a set of CFDs stored in the second snapshot. Otherwise, at step 1014, snapshot client 116 returns an error message. At step 1008, snapshot client 116 determines that the CFD matches the current CFD. Otherwise, at step 1014, snapshot client 116 returns an error message. At step 1010, snapshot client 116 determines that additional CFDs included in the set of CFDs stored in the first snapshot. Otherwise, at step 1014, snapshot client 116 returns an error message.

At step 1012, snapshot client 116 sets, as the current CFD, a next CFD included in the set of CFDs stored in the first snapshot, and method steps 1006-1012 are repeated until each of the CFs stored in the first snapshot are analyzed by snapshot client 116. In this way, snapshot client 116 accounts for each of the custom field definitions included in the first snapshot, thereby verifying that the reconstructed inventory does, in fact, include the same custom field definitions.

Turning now to FIG. 10B, at step 1016, snapshot client 116 sets, as a current custom field (CF), a first CF included in a set of CFs stored in the first snapshot. At step 1018, snapshot client 116 determines that a CF that corresponds to the current CF is included in a set of CFs stored in the second snapshot. Otherwise, at step 1026, snapshot client 116 returns an error message. At step 1020, snapshot client 116 determines that the CF matches the current CF. Otherwise, at step 1026, snapshot client 116 returns an error message. At step 1022, snapshot client 116 determines that additional CFs included in the set of CFs stored in the first snapshot. At step 1026, snapshot client 116 returns an error message.

At step 1024, snapshot client 116 sets, as the current CF, a next CF included in the set of CFs stored in the first snapshot, and method steps 1018-1024 are repeated until each of the CFs stored in the first snapshot are analyzed by snapshot client 116. In this way, snapshot client 116 accounts for each of the custom field values of entities included in the first snapshot, thereby verifying that each entity in the reconstructed inventory is, in fact, associated with the same custom field values.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of verifying that a reconstructed inventory of a virtualized computer system has been accurately reproduced from an original inventory of a virtualized computer system, comprising:
retrieving first and second snapshots, wherein the first snapshot is a snapshot of the original inventory and includes first relational data that identifies relationships between items in the original inventory, and the second snapshot is a snapshot of the reconstructed inventory and includes second relational data that identifies relationships between items in the reconstructed inventory;
generating, from the first snapshot, a first data structure based on the first relational data and, from the second snapshot, a second data structure based on the second relational data, wherein the first data structure stores, for each item in the original inventory, a path to said item in the original inventory, and the second data structure stores, for each item in the reconstructed inventory, a path to said item in the reconstructed inventory; and
analyzing the first data structure and the second data structure to determine that the reconstructed inventory is accurately reproduced from the original inventory if, for each item in the original inventory, the path to said item in the original inventory matches the path to a corresponding item in the reconstructed inventory and, for each item in the reconstructed inventory, the path to said item in the reconstructed inventory matches the path to a corresponding item in the original inventory.

2. The method of claim 1, further comprising:
analyzing the first snapshot and the second snapshot to determine that configuration settings of items in the original inventory match configuration settings of corresponding items in the reconstructed inventory.

3. The method of claim 1, further comprising:
analyzing the first snapshot and the second snapshot to determine that roles and permissions in the original inventory match roles and permissions in the reconstructed inventory.

4. The method of claim 3, wherein the roles and permissions define actions that may be performed on the items by one user or two or more users that belong to a class of users.

5. The method of claim 1, further comprising:
analyzing the first snapshot and the second snapshot to determine that custom definitions for one or more items in the original inventory match custom definitions for corresponding one or more items in the reconstructed inventory.

6. The method of claim 1, wherein the relationships of each item include at least one of an explicit path and an implicit path.

7. The method of claim 6, wherein the explicit path references a folder when the item is a virtual machine.

8. The method of claim 6, wherein the implicit path references a packaged virtual application for multiple virtual machines when the item is a virtual machine.

9. The method of claim 6, wherein the implicit path references a resource pool when the item is a virtual machine.

10. The method of claim 1, wherein each of the first snapshot and the second snapshot identify items in the respective inventories from which the snapshots are derived, the items including virtual machines, servers on which the virtual machines are running, one or more data centers in which the servers reside, and logical containers, the logical containers including folders for virtual machines, resource pools that each contain one or more virtual machines, and server clusters that each contain one or more servers.

11. The method of claim 1, wherein a linked-list data structure included in each of the first snapshot and the second snapshot is traversed to determine that the relationships between the items in the original inventory match the relationships between the corresponding items in the destination inventory.

12. The method of claim 11, wherein each node in the linked list data structure is an item in an inventory and each edge in the linked-list data structure connecting two nodes represents a relationship between two items in the inventory associated with the two nodes connected by the edge.

13. The method of claim 12, wherein a first mapping table and a second mapping table are generated from traversing the linked-list of the first snapshot and the second snapshot, respectively.

14. The method of claim 13, wherein each entry in the first mapping table corresponds to an item in an inventory, and stores an explicit path to the item and configuration data for the item.

15. A non-transitory computer-readable storage medium storing instructions that, when executed by a processor, cause the processor to verify that a reconstructed inventory of a virtualized computer system has been accurately reproduced from an original inventory of a virtualized computer system, comprising:
retrieving first and second snapshots, wherein the first snapshot is a snapshot of the original inventory and includes first relational data that identifies relationships between items in the original inventory, and the second snapshot is a snapshot of the reconstructed inventory and includes second relational data that identifies relationships between items in the reconstructed inventory;
generating, from the first snapshot, a first data structure based on the first relational data and, from the second snapshot, a second data structure based on the second relational data, wherein the first data structure stores, for each item in the original inventory, a path to said item in the original inventory, and the second data structure stores, for each item in the reconstructed inventory, a path to said item in the reconstructed inventory;
analyzing the first data structure and the second data structure to determine that the reconstructed inventory is accurately reproduced from the original inventory if, for each item in the original inventory, the path to said item in the original inventory matches the path to a corresponding item in the reconstructed inventory and, for each item in the reconstructed inventory, the path to said item in the reconstructed inventory matches the path to a corresponding item in the original inventory.

16. The non-transitory computer-readable storage medium of claim 15, further comprising:
analyzing the first snapshot and the second snapshot to determine that configuration settings of items in the original inventory match configuration settings of corresponding items in the reconstructed inventory.

17. The non-transitory computer-readable storage medium of claim 15, further comprising:
analyzing the first snapshot and the second snapshot to determine that roles and permissions in the original inventory match roles and permissions in the reconstructed inventory.

18. The non-transitory computer-readable storage medium of claim 15, further comprising:
analyzing the first snapshot and the second snapshot to determine that custom definitions for one or more items in the original inventory match custom definitions for corresponding one or more items in the reconstructed inventory.

19. The non-transitory computer-readable storage medium of claim 15, wherein the relationships of each item include at least one of an explicit path and an implicit path.

20. The non-transitory computer-readable storage medium of claim 15, wherein each of the first snapshot and the second identify items in the respective inventories from which they are derived, the items including virtual machines, servers on which the virtual machines are running, one or more data centers in which the servers reside, and logical containers, the logical containers including folders for virtual machines, resource pools that each contain one or more virtual machines, and server clusters that each contain one or more servers.

\* \* \* \* \*